(12) United States Patent
Hernejärvi et al.

(10) Patent No.: US 11,540,012 B2
(45) Date of Patent: Dec. 27, 2022

(54) METHODS AND SYSTEMS FOR PROVIDING PERSONALIZED CONTENT BASED ON SHARED LISTENING SESSIONS

(71) Applicant: Spotify AB, Stockholm (SE)

(72) Inventors: Perttu Santeri Hernejärvi, Sollentuna (SE); Issra Amir Omer, Stockholm (SE); Aron Joel Manucheri, Gothenburg (SE); Charlotta Ollesdotter, Gothenburg (SE); Daniel Per Åke Lindstrand, Gothenburg (SE); Mikael Ragnhult, Fjärås (SE); Mattias Svala, Gothenburg (SE); Oskar Kjellin, Stockholm (SE); Lonneke Van Es, Stockholm (SE); Oskar Werkelin Ahlin, Stockholm (SE); Erik Broberg, Stockholm (SE); Conor Taylor, Stockholm (SE); Björn Håkan Lindberg, Gothenburg (SE); Keenan Cassidy, Dublin (IE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/362,508

(22) Filed: Jun. 29, 2021

(65) Prior Publication Data
US 2021/0329337 A1    Oct. 21, 2021

Related U.S. Application Data

(63) Continuation of application No. 16/784,090, filed on Feb. 6, 2020, now Pat. No. 11,082,742.
(Continued)

(51) Int. Cl.
*H04N 21/439* (2011.01)
*H04N 21/442* (2011.01)
(Continued)

(52) U.S. Cl.
CPC ..... *H04N 21/44222* (2013.01); *H04N 21/439* (2013.01); *H04N 21/44* (2013.01); *H04N 21/485* (2013.01); *H04N 21/64784* (2013.01)

(58) Field of Classification Search
None
See application file for complete search history.

(56) References Cited

U.S. PATENT DOCUMENTS

| 5,758,259 A | 5/1998 | Lawler |
| 5,801,747 A | 9/1998 | Bedard |

(Continued)

FOREIGN PATENT DOCUMENTS

| EP | 0881591 A1 | 12/1998 |
| EP | 3543865 A1 | 9/2019 |

(Continued)

OTHER PUBLICATIONS

Broberg, Office Action, U.S. Appl. No. 16/868,404, dated Mar. 18, 2021, 9 pgs.

(Continued)

*Primary Examiner* — William J Kim
(74) *Attorney, Agent, or Firm* — Morgan, Lewis & Bockius LLP

(57) ABSTRACT

An electronic device receives a request, from a first device of a host user, to initiate a first shared playback session for the first device and one or more additional devices. The electronic device streams media content from a first playback queue to the first device and to the one or more additional devices, the first playback queue including one or more media content items corresponding to the first shared playback session. The electronic device determines that the first device of the host user has left the first shared playback session and, in response, maintains the first playback queue to be accessed by the one or more additional devices. After (Continued)

the host user has left the first shared playback session, the electronic device provides one or more media content items from the first playback queue to at least one of the one or more additional devices.

15 Claims, 10 Drawing Sheets

Related U.S. Application Data

(60) Provisional application No. 62/806,244, filed on Feb. 15, 2019.

(51) Int. Cl.
*H04N 21/485* (2011.01)
*H04N 21/647* (2011.01)
*H04N 21/44* (2011.01)

(56) References Cited

U.S. PATENT DOCUMENTS

| | | | |
|---|---|---|---|
| 5,848,398 | A | 12/1998 | Martin et al. |
| 6,005,597 | A | 12/1999 | Barrett et al. |
| 6,175,844 | B1 | 1/2001 | Stolin |
| 6,947,922 | B1 | 9/2005 | Glance |
| 9,112,849 | B1 | 8/2015 | Werkelin Ahlin et al. |
| 9,160,786 | B1 | 10/2015 | Jackson |
| 9,432,429 | B1 | 8/2016 | Ho |
| 9,568,994 | B2 | 2/2017 | Jehan |
| 10,063,600 | B1 | 8/2018 | Marsh et al. |
| 10,108,708 | B2 | 10/2018 | O'Driscoll et al. |
| 2002/0174428 | A1 | 11/2002 | Agnihotri et al. |
| 2003/0160770 | A1 | 8/2003 | Zimmerman |
| 2003/0208767 | A1 | 11/2003 | Williamson et al. |
| 2006/0033958 | A1 | 2/2006 | d'Entrecasteaux |
| 2006/0167576 | A1 | 7/2006 | Rosenberg |
| 2006/0242661 | A1 | 10/2006 | Bodlaender et al. |
| 2007/0100481 | A1 | 5/2007 | Toms et al. |
| 2007/0233743 | A1 | 10/2007 | Rosenberg |
| 2008/0091717 | A1 | 4/2008 | Garbow |
| 2008/0166967 | A1 | 7/2008 | McKillop |
| 2008/0261533 | A1 | 10/2008 | Bengtsson |
| 2008/0309647 | A1 | 12/2008 | Blose et al. |
| 2009/0063971 | A1 | 3/2009 | White et al. |
| 2009/0210415 | A1 | 8/2009 | Martin et al. |
| 2009/0217804 | A1 | 9/2009 | Lu et al. |
| 2009/0222392 | A1 | 9/2009 | Martin et al. |
| 2009/0300008 | A1 | 12/2009 | Hangartner et al. |
| 2009/0307731 | A1 | 12/2009 | Beyabani |
| 2010/0044121 | A1* | 2/2010 | Simon ................ G06F 3/04883 |
| | | | 178/18.03 |
| 2010/0106799 | A1 | 4/2010 | Calabrese |
| 2010/0205222 | A1 | 8/2010 | Gajdos et al. |
| 2010/0325135 | A1 | 12/2010 | Chen et al. |
| 2011/0004330 | A1 | 1/2011 | Rothkopf et al. |
| 2011/0106744 | A1 | 5/2011 | Becker et al. |
| 2011/0162001 | A1 | 6/2011 | Mehta et al. |
| 2011/0289155 | A1 | 11/2011 | Pimazar |
| 2011/0295843 | A1 | 12/2011 | Ingrassia, Jr. et al. |
| 2011/0314388 | A1 | 12/2011 | Wheatley |
| 2012/0117026 | A1 | 5/2012 | Cassidy |
| 2012/0117488 | A1 | 5/2012 | Amidon et al. |
| 2012/0209954 | A1 | 8/2012 | Wright |
| 2012/0290648 | A1 | 11/2012 | Sharkey |
| 2012/0290653 | A1 | 11/2012 | Sharkey |
| 2013/0018954 | A1 | 1/2013 | Cheng |
| 2013/0031162 | A1 | 1/2013 | Willis et al. |
| 2013/0198633 | A1 | 8/2013 | Hyman |
| 2013/0297599 | A1 | 11/2013 | Henshall |
| 2013/0297698 | A1 | 11/2013 | Odero et al. |
| 2013/0346875 | A1 | 12/2013 | Klein et al. |
| 2014/0028784 | A1 | 1/2014 | Deyerle et al. |
| 2014/0031961 | A1 | 1/2014 | Wansley et al. |
| 2014/0108946 | A1* | 4/2014 | Olofsson ................ G06F 3/0482 |
| | | | 715/739 |
| 2014/0119407 | A1 | 5/2014 | Miller |
| 2014/0123165 | A1 | 5/2014 | Mukhenjee et al. |
| 2014/0223099 | A1 | 8/2014 | Kidron |
| 2014/0245336 | A1 | 8/2014 | Lewis, II et al. |
| 2014/0277649 | A1 | 9/2014 | Chong et al. |
| 2015/0178624 | A1 | 6/2015 | Chee et al. |
| 2015/0222680 | A1 | 8/2015 | Grover |
| 2015/0249857 | A1 | 9/2015 | Dion et al. |
| 2015/0277852 | A1 | 10/2015 | Burgis |
| 2015/0355879 | A1 | 12/2015 | Beckhardt et al. |
| 2015/0356176 | A1 | 12/2015 | Billinski et al. |
| 2016/0007079 | A1 | 1/2016 | Vega-Zayas et al. |
| 2016/0066038 | A1 | 3/2016 | Chesluk et al. |
| 2016/0080473 | A1 | 3/2016 | Coburn, IV |
| 2016/0085499 | A1 | 3/2016 | Corbin et al. |
| 2016/0127777 | A1 | 5/2016 | Roberts et al. |
| 2016/0156687 | A1 | 6/2016 | Leung |
| 2016/0277802 | A1* | 9/2016 | Bernstein ......... H04N 21/41407 |
| 2016/0292269 | A1 | 10/2016 | O'Driscoll et al. |
| 2016/0292272 | A1 | 10/2016 | O'Driscoll et al. |
| 2016/0330794 | A1 | 11/2016 | Ozcan |
| 2017/0034263 | A1 | 2/2017 | Archambault et al. |
| 2017/0093769 | A1* | 3/2017 | Lind ....................... H04L 51/38 |
| 2017/0093943 | A1 | 3/2017 | Alsina |
| 2017/0103075 | A1 | 4/2017 | Toumpelis |
| 2017/0171898 | A1 | 6/2017 | Jamal-Syed et al. |
| 2017/0251040 | A1 | 8/2017 | Archambault et al. |
| 2017/0289202 | A1 | 10/2017 | Krasadakis |
| 2018/0139155 | A1 | 5/2018 | Kurisu et al. |
| 2019/0018644 | A1 | 1/2019 | Kovacevic et al. |
| 2019/0050483 | A1 | 2/2019 | O'Driscoll et al. |
| 2019/0121823 | A1 | 4/2019 | Miyazaki et al. |
| 2019/0243534 | A1 | 8/2019 | Vega et al. |
| 2019/0325035 | A1 | 10/2019 | Sagui et al. |
| 2019/0370280 | A1* | 12/2019 | Shenoy .............. H04N 21/4305 |
| 2020/0082019 | A1 | 3/2020 | Allen et al. |

FOREIGN PATENT DOCUMENTS

| | | |
|---|---|---|
| EP | 3554091 A1 | 10/2019 |
| WO | WO2016156553 | 10/2016 |
| WO | WO2016156554 | 10/2016 |
| WO | WO2016156555 | 10/2016 |

OTHER PUBLICATIONS

Broberg, Final Office Action, U.S. Appl. No. 16/868,404, dated Aug. 5, 2021, 12 pgs.
Broberg, Notice of Allowance, U.S. Appl. No. 16/868,404, dated Nov. 19, 2021, 7 pgs.
Spotify AB, International Search Report and Written Opinion, PCTZEP2016/057176, dated Jun. 14, 2016, 10 pgs.
Hemejarvi, Office Action, U.S. Appl. No. 16/784,090, dated Jan. 29, 2021, 8 pgs.
Hemejarvi, Notice of Allowance, U.S. Appl. No. 16/784,090, dated Mar. 31, 2021, 5 pgs.
Nelson Granados, Flo: Finally, an app that lets partygoers mix the playlist on the fly, May 27, 2016, https://www.forbes.com/sites/nelsongranados/2016/05/27/flo-finally-an-app-to-crowdsource-live-the-partys-playlist/#41e8d2a45c41, 4 pgs.
Newswatch, Party Play—A collaborative playlist from all your party guests, Oct. 20, 2017, https://newswatchtv.com/2017/10/20/party-play-newswatch-review/ , 2 pgs.
Buskirk, AudioVroom changes the social radio game, http://evolver.fm/2011/03/23/audiovroom-changes-the-social-radio-game/, Mar. 23, 2011, 5 pgs.
O'Driscoll, Office Action, U.S. Appl. No. 15/087,448, dated Aug. 1, 2016, 20 pgs.
O'Driscoll, Final Office Action, U.S. Appl. No. 15/087,448, dated Jan. 19, 2017, 24 pgs.
O'Driscoll, Office Action, U.S. Appl. No. 15/087,448, dated Aug. 3, 2017, 37 pgs.
O'Driscoll, Final Office Action, U.S. Appl. No. 15/087,448, dated Mar. 12, 2018, 39 pgs.

(56) References Cited

OTHER PUBLICATIONS

O'Driscoll, Office Action, U.S. Appl. No. 15/087,448, dated Aug. 15, 2018, 33 pgs.
O'Driscoll, Final Office Action, U.S. Appl. No. 15/087,448, dated Mar. 27, 2019, 42 pgs.
O'Driscoll, Office Action, U.S. Appl. No. 15/087,448, dated Nov. 21, 2019, 45 pgs.
O'Driscoll, Final Office Action, U.S. Appl. No. 15/087,448, dated Jul. 13, 2020, 45 pgs.
Pauws, et al., "Fast Generation of Optimal Music Playlists using Local Search", Philips Research Europe, 2006, 6 pages.
Patricks, Notice of Allowance, U.S. Appl. No. 16/903,085, dated Jul. 23, 2021, 5 pgs.
Patricks, Office Action, U.S. Appl. No. 16/903,085, dated Mar. 29, 2021, 8 pgs.
Patricks, Office Action, U.S. Appl. No. 16/903,078, dated Sep. 10, 2021, 20 pgs.
Patricks, Final Office Action, U.S. Appl. No. 16/903,078, dated Mar. 28, 2022, 27 pgs.
Spotify AB, Extended European Search Report, EP21165870,3, dated Jun. 8, 2021, 7 pgs.
Stojmenovic, et al., "Bluetooth scatternet formation in ad hoc wireless networks", University of Ottawa, Jan. 2006, 28 pages.
Sutterer, et al., "UPOS: User Profile Ontology with Situation-Dependent Preferences Support", First International Conference on Advances in Computer-Human Interaction, Mar. 2008, pp. 230-235, 6 pages.
Wang, et al., "Context-Aware Mobile Music Recommendation for Daily Activities", School of Computing, National University of Singapore, MM'12, Oct. 29-Nov. 2, 2012, pp. 99-108, 10 pages.
Xiao, et al., "Learning a Music Similarity Measure on Automatic Annotations with Application to Playlist Generation", CASSP 2009, pp. 1885-1888, 4 pages.
Written Opinion of the International Preliminary Examining Authority dated Jun. 10, 2016 for PCT International Patent Application No. PCT/EP2016/057177, 8 pages.
International Search Report and Written Opinion of the International Searching Authority dated Jul. 11, 2016 for PCT International Patent Application No. PCT/EP2016/057175, 12 pages.
United States Patent and Trademark Office, Office Action dated Sep. 22, 2016 for U.S. Appl. No. 15/087,455, 10 pages.
United States Patent and Trademark Office, Office Action dated Sep. 26, 2016 for U.S. Appl. No. 15/087,428, 9 pages.
United States Patent and Trademark Office, Final Office Action dated Mar. 8, 2017 for U.S. Appl. No. 15/087,455, 11 pages.
United States Patent and Trademark Office, Office Action dated Mar. 29, 2017 for U.S. Appl. No. 15/087,428, 14 pages.
International Preliminary Report on Patentability dated May 31, 2017 for PCT International Patent Application No. PCT/EP2016/057176, 11 pages.
United States Patent and Trademark Office, Office Action dated Oct. 26, 2017 for U.S. Appl. No. 15/087,455, 13 pages.
United States Patent and Trademark Office, Office Action dated Jan. 5, 2018 for U.S. Appl. No. 15/087,428, 16 pages.
Communication pursuant to Article 94(3) EPC dated Apr. 24, 2018 for EP Application No. 16712927.9, 5 pages.
Communication pursuant to Article 94(3) EPC dated Apr. 24, 2018 for EP Application No. 16712928.7, 6 pages.
United States Patent and Trademark Office, Notice of Allowance dated Jun. 14, 2018 for U.S. Appl. No. 15/087,455, 27 pages.
United States Patent and Trademark Office, Office Action dated Aug. 2, 2018 for U.S. Appl. No. 15/087,428, 16 pages.
Summons to attend oral proceedings pursuant to Rule 115(1) EPC dated Oct. 10, 2018 for EP Application No. 16712927.9, 7 pages.
Result of consultation by telephone from the applicant dated Feb. 8, 2019 for EP Application No. 16712927.9, 4 ages.
Communication pursuant to Article 94(3) EPC dated May 10, 2019 for EP Application No. 16712928.7, 8 pages.
United States Patent and Trademark Office, Office Action dated Jun. 20, 2019 for U.S. Appl. No. 15/087,428, 15 pages.
Decision to grant a European patent pursuant to Article 97(1) EPC dated Jul. 11, 2019 for EP Application No. 16712927.9, 2 pages.
Extended European Search Report dated Jul. 11, 2019 for EP Application No. 19172512.6, 10 pages.
United States Patent and Trademark Office, Office Action dated Feb. 13, 2020 for U.S. Appl. No. 15/087,428, 17 pages.
Elliott et al., Personal Soundtrack: Context-aware playlists that adapt to user pace, Proceedings of ACM CHI 2006, Apr. 22-28, 2006, Montreal, Quebec, Canada, pp. 736-741 (Year: 2006).
Hemejarvi, Notice of Allowance, U.S. Appl. No. 16/903,078, Jul. 13, 2022, 9 pgs.
O'Driscoll, Final Office Action, U.S. Appl. No. 16/879,644, Jul. 12, 2022, 31 pgs.
Patricks, Final Office Action, U.S. Appl. No. 16/903,078, Mar. 28, 2022, 27 pgs.
Patricks, Office Action, U.S. Appl. No. 17/506,512, Jul. 27, 2022, 7 pgs.

* cited by examiner

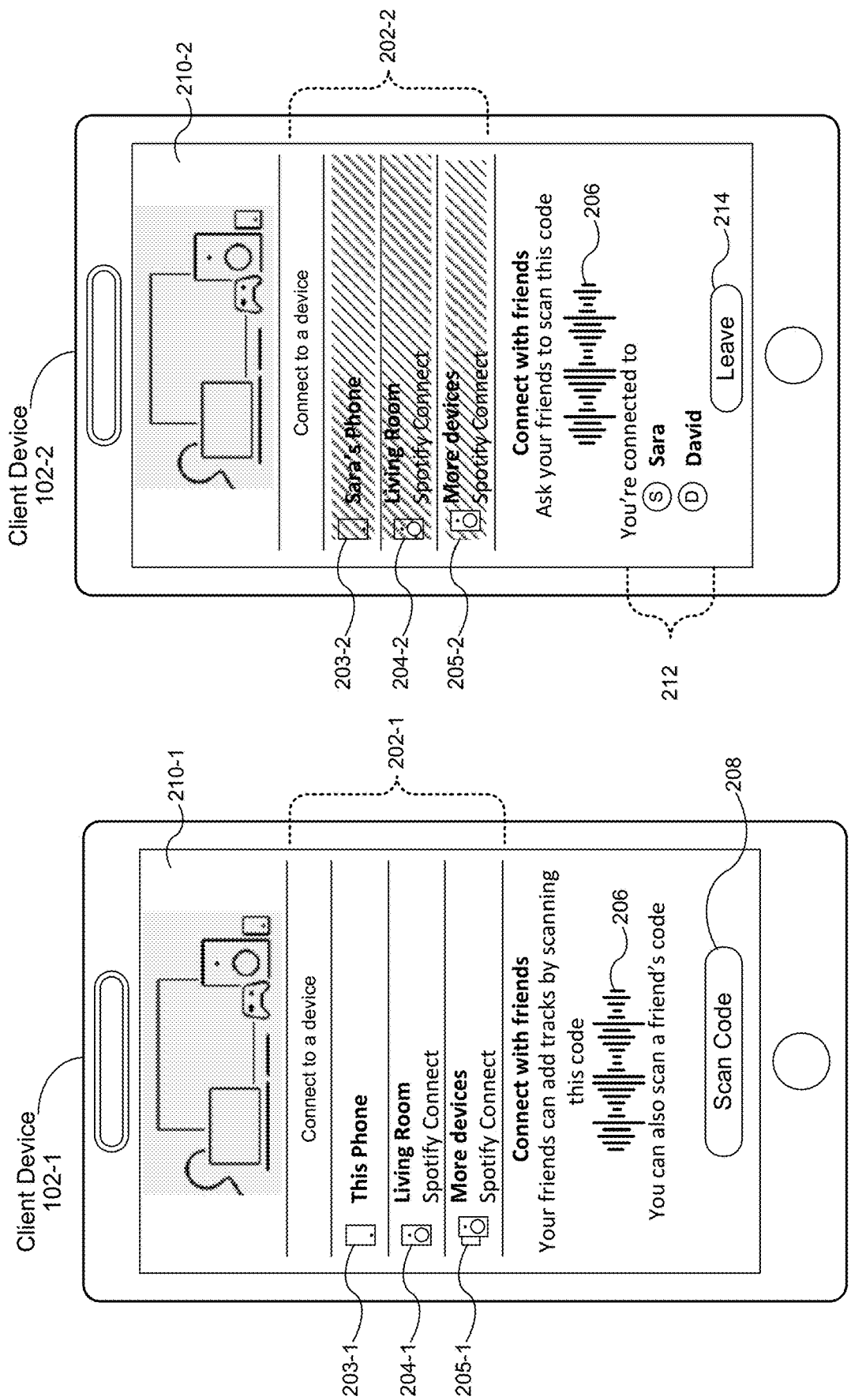

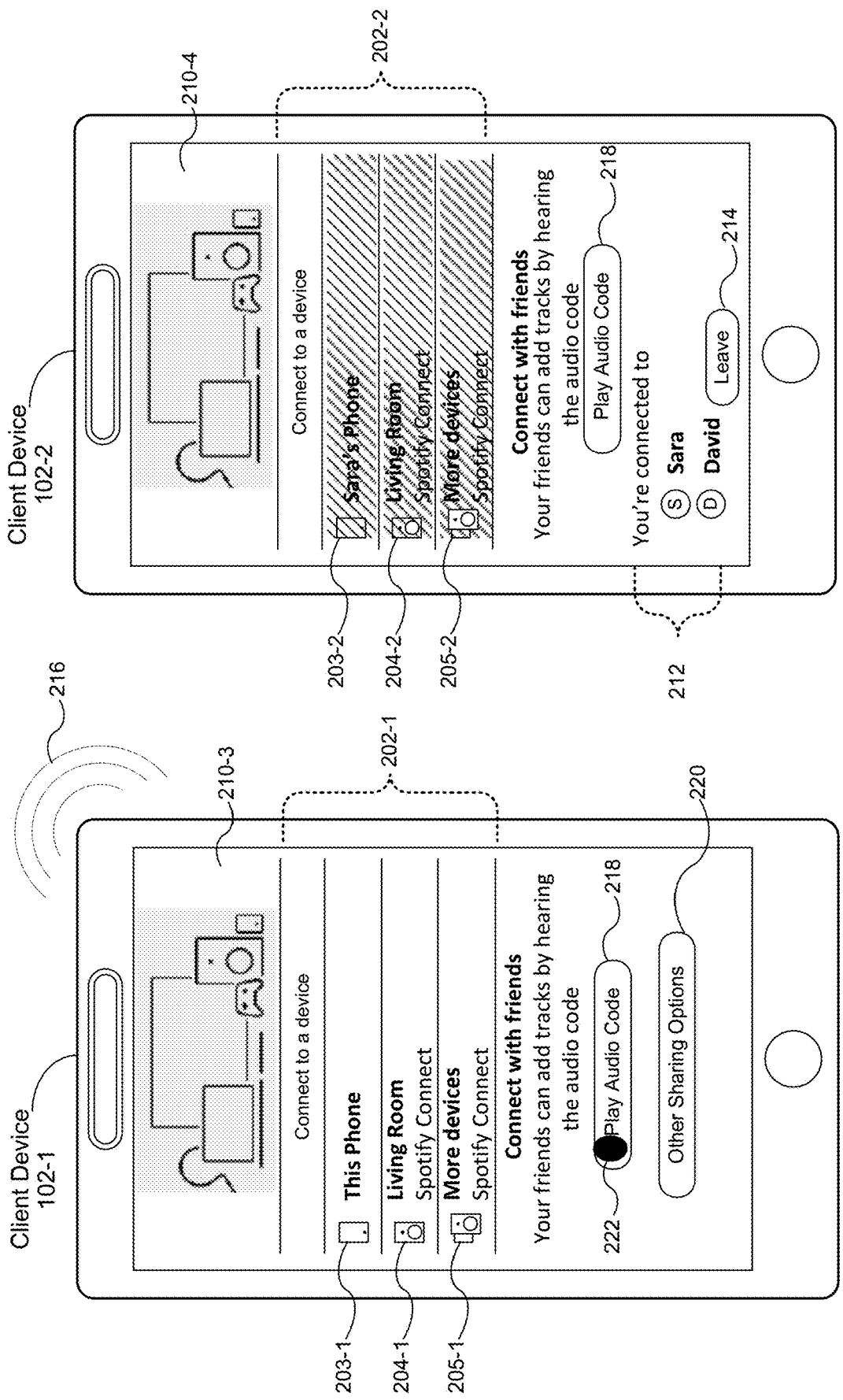
FIGURE 2C / FIGURE 2D

300

302 — At an electronic device associated with a media-providing service and having one or more processors and memory storing instructions for execution by the one or more processors:

304 — Store, for a first user of the media-providing service, a listening history corresponding to media content items provided by the media-providing service that have been previously consumed by the first user.

306 — The listening history of the first user includes content items selected by the first user for a playback queue of the first user.

308 — Establish a shared playback queue in accordance with a determination that the first user has obtained information for the shared playback session from the second user.

310 — Send the information for the shared playback session to the second electronic device of the second user. The first device of the first user obtains the information for the shared playback session from the second device of the second user.

312 — Provide the second device of the second user with user-selectable options to select how to provide the information for the shared playback session from the second device to the first device.

314 — The first device of the first user provides information for the shared playback session to a third device.

316 — Any user of the media-providing service that has obtained the information for the shared playback session may share the information with additional users of the media-providing service.

318 — Receive, from the first device, a request to join the shared playback queue. In response to the request, determine a device type of the first device. Select a joining method based on the device type.

320 — Provide a shared playback queue to a first device of the first user and a second device of a second user, the shared playback queue including one or more media content items corresponding to a shared playback session.

322 — Provide information corresponding to the shared playback queue to a presentation device.

324 — The listening history corresponds to a first listening history. Store, for the first user, the one or more media content items of the shared playback queue in a second listening history of the first user that is distinct from the first listening history.

FIGURE 3A

METHODS AND SYSTEMS FOR PROVIDING PERSONALIZED CONTENT BASED ON SHARED LISTENING SESSIONS

RELATED APPLICATIONS

This application is a continuation of U.S. patent application Ser. No. 16/784,090, filed Feb. 6, 2020, entitled "Methods and Systems for Providing Personalized Content Based on Shared Listening Sessions," which claims priority to U.S. Prov. Patent App. 62/806,244, filed Feb. 15, 2019, all of which are hereby incorporated by reference in their entirety.

TECHNICAL FIELD

The disclosed embodiments relate generally to media playback, and, in particular, providing shared media playback sessions.

BACKGROUND

Access to electronic media, such as music and video content, has expanded dramatically over time. As a departure from physical media, media content providers stream media to electronic devices across wireless networks, improving the convenience with which users can digest and experience such content.

As part of the service they provide and to assist users in discovering new content, media content providers track and process user data in an attempt to understand user preferences, and ultimately to provide relevant content to users.

SUMMARY

Streaming media content to many electronic devices associated with many different users creates an opportunity to allow multiple users to have a shared media content experience. For example, a shared user experience allows each member within a group of users to contribute to and control a collection of media content. In this way, a plurality of users is enabled to access, contribute to, and control playback of media content items.

A user participating in a shared media content session may wish to limit or control the extent to which content not selected by the user influences the listening history of the user and content suggestions provided to the user. Accordingly, there is a need for systems and methods for personalizing media content based at least in part on the sources of media content selection during a shared media experience. By identifying the sources of media items that are consumed by a user, content providers are able to determine whether media items have been selected by the user or by another party, and how these selections should affect the user's personal listening profile. The user's personal listening profile is then used to generate personalized recommendations for the user. The content provider is therefore better able to personalize content by distinguishing between media items that the user selected and media items that the user did not select.

In accordance with some embodiments, a method is performed at an electronic device (e.g., associated with a media content provider) having one or more processors and memory storing instructions for execution by the one or more processors. The electronic device is associated with a media-providing service. The method includes storing, for a first user of the media-providing service, a listening history corresponding to media content items provided by the media-providing service that have been previously consumed by the first user. The method further includes providing a shared playback queue to a first device of the first user and a second device of a second user, the shared playback queue including one or more media content items corresponding to a shared playback session. The method further includes identifying a source of a first media content item of the one or more media content items in the shared playback queue. The method includes, based on the identified source of the first media content item in the shared playback queue, determining whether to include the first media content item in the listening history of the first user. The method includes providing information for a second media content item to the first device of the first user based on the listening history of the first user.

In accordance with some embodiments, an electronic device (e.g., a server system, a client device, etc.) includes one or more processors and memory storing one or more programs configured to be executed by the one or more processors. The one or more programs include instructions for performing the operations of the method described above. In accordance with some embodiments, a computer-readable storage medium has stored therein instructions that, when executed by an electronic device, cause the server system to perform the operations of the method described above.

Providing personalized content directly to the device of a user, without requiring user input to generate a set of content for playback, reduces and/or eliminates user navigation through a series of user interfaces (e.g., user interfaces indicating content associated with various content creators) for the purpose of content selection and organization. Reducing user input to navigate a series of user interfaces for assembling a set of content for playback reduces the extent to which user interface data and user input data is transmitted between devices in a media content system and reduces the processing power and power consumption required for providing content to users, thereby improving the functioning of the devices. Further, distinguishing between sources of the media content and selectively storing content items that have been selected by a predefined source reduces the amount of memory used to store listening history information for a user.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

FIGS. 2A-2J illustrate graphical user interfaces for client devices participating in a shared media content session in accordance with some embodiments.

FIGS. 3A-3B are flow diagrams illustrating methods for personalizing content in accordance with some embodiments.

DETAILED DESCRIPTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first client device could be termed a second client device, and, similarly, a second client device could be termed a first client device, without departing from the scope of the various described embodiments. The first client device and the second client device are both client devices, but they are not the same client device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Figure 1:
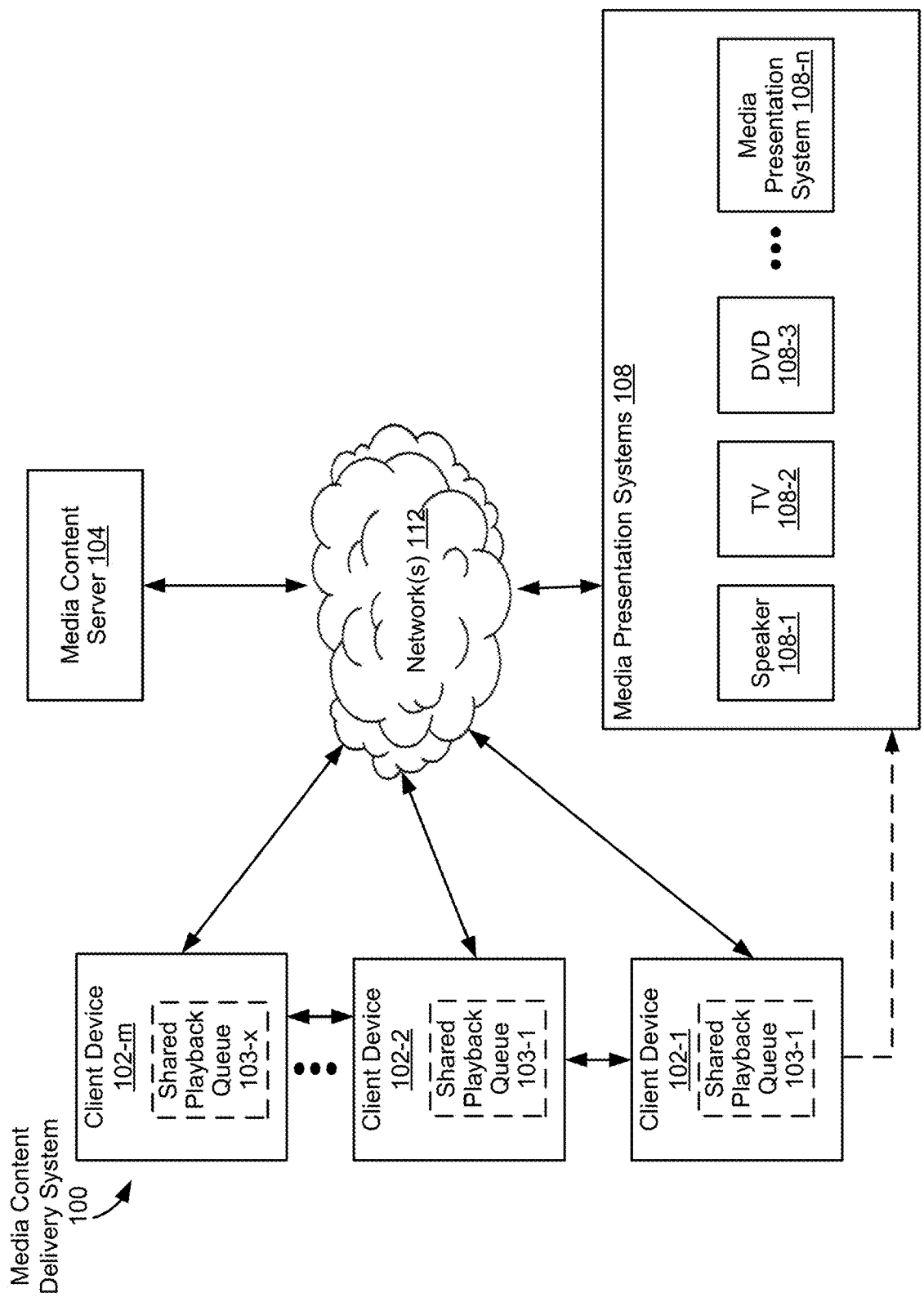
FIG. 1 is a block diagram illustrating a media content delivery system in accordance with some embodiments.

FIG. 1 is a block diagram illustrating a media content delivery system 100 in accordance with some embodiments. The media content delivery system 100 includes one or more client devices 102 (e.g., client device 102-1 to client device 102-m, where m is an integer greater than one), one or more media content servers 104, and one or more media presentation systems 108, including speaker 108-1, television (TV) 108-2, digital versatile disk (DVD) player 108-3, and/or other media presentation system 108-n (where n is an integer greater than three). The one or more media content servers 104 are associated with (e.g., at least partially compose) a media-providing service. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, a client device 102-1, 102-2, or 102-m is associated with one or more users. In some embodiments, a client device 102 is a personal computer, mobile electronic device, wearable computing device, laptop computer, tablet computer, mobile phone, feature phone, smart phone, digital media player, or any other electronic device capable of presenting media content (e.g., audio and/or video). A client device 102 connects to a media presentation system 108 wirelessly or through a wired connection (e.g., directly through an interface, such as an HDMI interface). In some embodiments, a client device 102 is a headless client. In some embodiments, client devices 102-1 and 102-m are the same type of device (e.g., client device 102-1 and client device 102-m are both mobile devices). Alternatively, client device 102-1 and client device 102-m are different types of devices.

In some embodiments, client devices 102-1, 102-2, and 102-m send and receive media-control information through the networks 112. For example, client devices 102-1, 102-2, and 102-m send media control requests (e.g., requests to play music, movies, videos, or other media items, or playlists thereof) to media content server 104 through network(s) 112. In some embodiments, client devices 102-1, 102-2, and 102-m, receive authentication tokens from the media content server 104 through network(s) 112.

In some embodiments, client device 102-1 communicates directly (e.g., through a wired and/or wireless connection) with client devices 102-2 and/or 102-m. For example, in some embodiments client devices 102 directly communicate playback commands and/or audio code signals between each other (e.g., the media content server 104 may or may not be involved in the exchange). In some embodiments, client device 102-2 communicates directly with client device 102-m. In some embodiments, client device 102-1 communicates directly with media presentation systems 108. As pictured in FIG. 1, client device 102-1 is able to communicate directly (e.g., through a wired and/or wireless connection) with media presentation systems 108, while client device 102-m communicates with the media presentation systems 108 through network(s) 112. In some embodiments, client device 102-1 uses the direct connection with media presentation systems 108 to stream content (e.g., data for media items) for playback on the media presentation systems 108.

In some embodiments, client device 102-1, client device 102-2 and client device 102-m each include a media application 422 (FIG. 4) that allows a user of the client device to browse, request (e.g., for playback at the client device 102 and/or a media presentation system 108), and/or present media content (e.g., control playback of music tracks, videos, etc.). Media content may be stored locally (e.g., in memory 412 of the client device 102, FIG. 4) and/or received in a data stream (e.g., from the media content server 104). The media presentation system 108 may be part of the client device 102, such as built-in speakers and/or a display, or may be separate from the client device 102, such as a wirelessly coupled speaker (e.g., speaker 108-1).

In some embodiments, client device 102-1 and client device 102-2 each include an instance of shared playback queue 103-1 (e.g., within media application 422). In some embodiments, shared playback queue 103-1 includes a set (e.g., an ordered list, such as a playlist) of media content items provided by the media content server 104. For example, the media content server 104 establishes a shared playback session (e.g., for two or more client devices of two or more users), stores a shared playback queue corresponding to the shared playback session, and/or provides the shared playback queue to the two or more client devices (e.g., client device 102-1 and client device 102-2). In some embodiments, the two or more client devices 120 are enabled to view and/or edit (e.g., add, remove, and/or reorder) content in the shared playback queue. For example, client device 102-1 and client device 102-2 are each provided with at least a portion of the same shared playback queue 103-1. In some embodiments, the shared playback queue 103-1 includes media content items selected by any combination of client device 102-1, client device 102-2, any other client device(s) 102, presentation systems 108, and/or the media content server 104. In some embodiments, the media content items from the shared playback queue are streamed to (e.g., played at and/or provided to) one or more of media presentation systems 108. For example, each client device 102-1 and client device 102-2 accesses (e.g., views, edits (adds and/or removes media content items from), and/or controls presentation of) the shared playback queue 103-1 while the shared playback queue is presented at one or more of media presentation systems 108. Co-located users are enabled to access the shared playback queue 103-1 on individual devices while streaming media content through media presentation system 108. In some embodiments, the media content items from the shared playback queue are streamed to each of the client devices 102-1 and 102-2 (e.g., instead of or in addition to media presentation system 108). It is to be understood that the shared playback queue 103-1 is enabled to be shared on additional client devices 102 in addition to client device 102-1 and client device 102-2. In some embodiments, a shared playback queue 103-x (distinct from shared playback queue 103-1) is shared between a plurality of client devices 102 (including client device 102-m). For example, the media content server 104 provides a plurality of shared playback queues 103-1 through 103-x, where the shared playback queue 103-1 is provided to a first subset of client devices 102 (e.g., client devices 102-1 and 102-2) and the shared playback queue 103-x is provided to a second subset of client devices 102 (e.g., including client device 102-m) (e.g., distinct from the first subset).

In some embodiments, the media content server 104 stores and provides media content (also referred to as media items) (e.g., media content requested by the media application 422 of client device 102-1, 102-2, and/or 102-m, and/or the shared playback queue 103-1) to client devices 102 and/or media presentation systems 108 via the network(s) 112. Content stored and served by the media content server 104, in some embodiments, includes any appropriate content, including audio (e.g., music, spoken word, podcasts, etc.), videos (e.g., short-form videos, music videos, television shows, movies, clips, previews, etc.), text (e.g., articles, blog posts, emails, etc.), images (e.g., photographs, drawings, renderings, etc.), games (e.g., 2- or 3-dimensional graphics-based computer games, etc.), or any combination of content types (e.g., web pages that include any combination of the foregoing types of content or other content not explicitly listed). Audio media items (i.e., audio items) may be referred to as tracks. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

As described above, media presentation systems 108 (e.g., speaker 108-1, TV 108-2, DVD 108-3, media presentation system 108-n) are capable of receiving media content (e.g., from the media content server 104) and presenting the received media content. For example, speaker 108-1 may be a component of a network-connected audio/video system (e.g., a home entertainment system, a radio/alarm clock with a digital display, or an infotainment system of a vehicle). In some embodiments, the media content server 104 sends media content to the media presentation systems 108. For example, media presentation systems 108 include computers, dedicated media players, network-connected stereo and/or speaker systems, network-connected vehicle media systems, network-connected televisions, network-connected DVD players, and universal serial bus (USB) devices used to provide a playback device with network connectivity, and the like.

FIG. 2A illustrates a graphical user interface 210-1 displayed by a display of a client device 102-1 associated with a user (e.g., Sara). The graphical user interface 210-1 illustrated in FIG. 2A represents a first sharing interface from a host user's (e.g., Sara's) perspective. In some embodiments, the graphical user interface on device 102-1 includes a device selection portion 202-1. The device selection portion 202-1 includes user interface objects that correspond to one or more presentation devices, such as "This Phone" 203-1, "Living Room" 204-1, and "More devices" 205-1. In some embodiments, the device 102-1 receives a user input at a location that corresponds to a presentation device user interface object in the device selection portion 202-1 to select a presentation device for presentation of the media content (e.g., received by device 102-1 from media-providing server 104). For example, the device receives a user input (e.g., from Sara) at a location corresponding to the displayed user interface object labeled "This Phone" 203-1 to select client device 102-1 as the presentation device. In this manner, client device 102-1 is selected as the playback device for a shared playback queue to which multiple client devices 102 are able to contribute.

In some embodiments, the graphical user interface 210-1 displayed by device 102-1 (and graphical user interface 210-2 displayed by device 102-2) includes a volume control for controlling the playback volume of the selected presentation device.

The first sharing interface 210-1 from the host user's perspective allows the host to initiate a shared playback session (e.g., using the Connect with friends portion of the interface). The shared playback session allows each of the participating users (e.g., the host user and the participants) to access a shared playback queue associated with the playback session. For example, a single shared playback queue is presented to all users of the shared playback session. In some embodiments, the shared playback queue corresponds to a playlist that includes media content items to be presented (e.g., at the selected presentation device). The users are able to access the queue and/or leave the queue.

In some embodiments, to initiate the shared playback session, the client device 102-1 displays a code 206 that can be scanned by a camera or sensor of a second client device (e.g., device 102-2). For example, code 206 is a machinereadable code as described in U.S. Pat. No. 10,133,947, hereby incorporated by reference in its entirety. In some embodiments, code 206 is an image including a row of bars of varying lengths, a bar code, a QR code, or another optical code. The graphical user interface 210-1 displayed by client device 102-1 includes a user-selectable affordance "Scan Code" 208, which, when selected, initiates a mode in which device 102-1 is enabled to scan a code (e.g., using a camera of device 102-1) presented on another user's device (e.g., to join as a participant instead of as a host). For example, the client device 102-1 has the option to either host the shared playback session (e.g., by having another user scan the code 206) or to be a participant in another user's shared playback session (e.g., by selecting "Scan Code" 208 and then scanning a code displayed on another user's device).

Figure 2F:
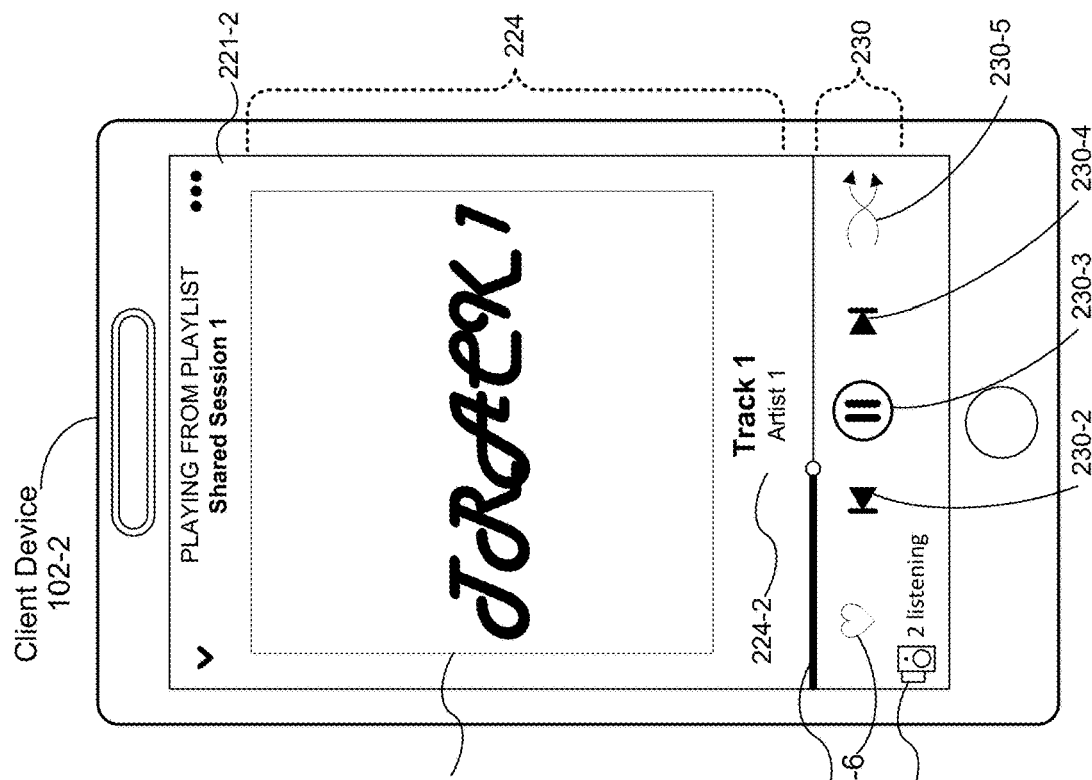

FIG. 2B illustrates a graphical user interface 210-2 displayed by client device 102-2 associated with a second user (e.g., David). In some embodiments, graphical user interface 210-1 and graphical user interface 210-2 are generated by a program associated with a media content provider (e.g., media application 422, user interface module 420, and/or a module executed by media content server that transmits graphical user interface data to one or more client devices). In some embodiments, graphical user interfaces 210-3 (FIG. 2C), 210-4 (FIG. 2D), 221-1 (FIG. 2E), and/or 221-2 (FIGS. 2F, 2H, 2I and 2J) are generated by the same software.

Graphical user interface 210-2 is displayed after the client device 102-2 has scanned a code to join a shared playback session that was displayed on another device. For example, David (using client device 102-2) scans Sara's code 206 (displayed on Sara's device 102-1). In response to scanning Sara's code 206, David has joined a shared playback session with Sara. In some embodiments, Sara is designated to be the host of the shared playback session because Sara's code 206 was used to initiate the shared playback session. In some embodiments, a server system initiates (e.g., establishes) the shared playback session in response to receiving an indication that a first user's code has been scanned by another user of the media-providing service.

In some embodiments, a first subset of controls for playback of the shared queue are only available to the host and a second subset of controls for playback of the shared queue are available to all members of the shared playback session. As shown in FIG. 2B, graphical user interface 210-2 includes a device selection portion 202-2. In some embodiments, when client device 102-1 is the host device of a shared playback session, client device 102-2 is not enabled to select a presentation device. For example, only the host device of the shared playback session is enabled to select a presentation device for presenting content of the shared playback queue 103 and participants of the shared playback session are not enabled to change the device at which media content is played back. In some embodiments, graphical user interface 210-2 displayed on client device 102-2 includes user interface objects that correspond to one or more presentation devices, such as "Sara's Phone" 203-2, "Living Room" 204-2, and "More devices" 205-2. In some embodiments, the one or more presentation devices indicated in device selection portion 202-2 on graphical user interface 210-2 correspond to the one or more presentation devices indicated in device selection portion 202-1 on graphical user interface 210-1. In some embodiments, the user interface objects 203-2, 204-2 and 205-2 are non-selectable user interface objects (e.g., as indicated by the shading of the user interface objects). In some embodiments, the user of client device 102-2 is not enabled to select the presentation device (e.g., only the host device is enabled to select the presentation device). In some embodiments, a volume control is displayed to all members (e.g., the host and all participants) of a shared playback session, enabling any of the users in the shared playback session to control the loudness of media playback by the presentation device.

In the illustrative example of FIG. 2B, before joining the shared playback session, client device 102-2 (e.g., David's device) was consuming (e.g., listening to) media content (e.g., from David's personal listening queue/music library). For example, the media-providing service was streaming media content from David's personal queue to David at device 102-2. In response to David's device 102-2 scanning code 206 displayed by Sara's device 102-1, the media-providing service stops streaming media content from David's personal queue to device 102-2, and initiates playback of the media content included in a shared playback queue associated with the shared playback session at the presentation device selected by the host (e.g., Sara). In some embodiments, the media-providing service streams the shared playback queue to David's device 102-2 in addition to playback device 102-1.

Client device 102-2 further indicates the user(s) that are connected to the shared playback session in a shared playback session user listing portion 212 (labeled "You're connected to") of the graphical user interface. The shared playback session user listing portion 212 indicates identifying information of users that have joined the shared playback session. Identifying information for the user (e.g., owner) of the device that displays the shared playback session user listing (e.g., "David") may or may not be displayed in the listing. The graphical user interface 210-2 also has a user-selectable affordance to "Leave" 214 the shared playback session. In some embodiments, in response to activation of "Leave" at a device, the device disconnects from the shared playback session.

In some embodiments, after client device 102-2 has joined the shared playback session, the client device 102-2 displays code 206 for the shared playback session that includes client device 102-1 and 102-2 (e.g., the same code 206 is displayed on device 102-1 and device 102-2). Another client device is enabled to join the shared playback session by scanning the code 206 on either client device 102-1 or 102-2 (e.g., every user in the session is enabled to display a code to allow additional users to join the session).

In some embodiments, the code 206 expires after a predefined amount of time. In some embodiments, at the end of the shared playback session, the code 206 ceases to be displayed. In some embodiments, when code 206 ceases to be displayed, a new code (corresponding to a second shared playback session) is displayed. For example, the code 206 is uniquely associated with the shared playback session (e.g., each playback session has its own code). In some embodiments, alternative sharing methods are used in lieu of or in addition to displaying a scannable code. For example, a shared playback session is established via:

playback, by a first (host) device of an audio code that is detectable by a second device, A PIN (e.g., a four (or other integer) digit (numeric and/or alphanumeric) code displayed to the host device) that can be input at a second device, A determination of geographic co-location (e.g., in accordance with a determination that a second device comes within a predetermined distance of a first (host) device), A link (e.g., a universal resource locator) transmitted from the first client device to the second client device (e.g., directly transmitted between client devices or forwarded via media content server 104), and/or a determination that the client devices are connected to a same wireless network (e.g., Wi-Fi).

In some embodiments, the code is assigned to the session by the server system of the media-providing service.

FIGS. 2C-2D illustrate examples of client devices 102-1 and 102-2 using an audio code (e.g., instead of a scannable code 206) to establish and/or connect to the shared playback session. For example, FIG. 2C displays a graphical user interface 210-3 that includes an affordance labeled "Play Audio Code" 218, which, when selected (e.g., by user input 222) causes the client device 102-1 to output an audio signal that corresponds to audio code 216. Audio code 216 is an audio item (e.g., audible range, ultrasonic, and/or infrasonic) that uses one or more audio characteristics (e.g., frequency, duration, amplitude, combinations of tones, and/or variations thereof over time) to identify (e.g., uniquely identify) a shared listening session. In some embodiments one or more speakers of client device 102-1 output an audio code. The client device 102-2 receives audio code 216 using one or more microphones of the client device. Upon receiving audio code 216, client device 102-2 (and/or client device 102-1) transmits information associated with audio code 216 (e.g., the audio code or information generated based on the received audio code) to the media server 104. In response to receiving the information associated with the audio code, the media server causes the shared playback session that is associated with the audio code from client device 102-1 to be joined by client device 102-2.

In some embodiments, the graphical user interface 210-3 displayed by client device 102-1 includes an affordance 220 (labeled "Other Sharing Options") that, when selected, causes a list of options for establishing and/or connecting to the shared playback session to be displayed. In some embodiments, the user selects, from the list of options, a method of connecting to the shared playback session.

FIG. 2D illustrates a graphical user interface 210-4 displayed on client device 102-2 after joining the shared playback session hosted by client device 102-1. For example, client device 102-2 received the audio code 216 output by client device 102-1, and, in response to receiving the audio code 216, joined the shared playback session. In some embodiments, in response to receiving audio code 216, client device 102-1 displays, on graphical user interface 210-4, affordance 218, that, when selected causes client device 102-2 to output the audio code 216 to allow additional users to join via the audio code 216.

Figure 2E:
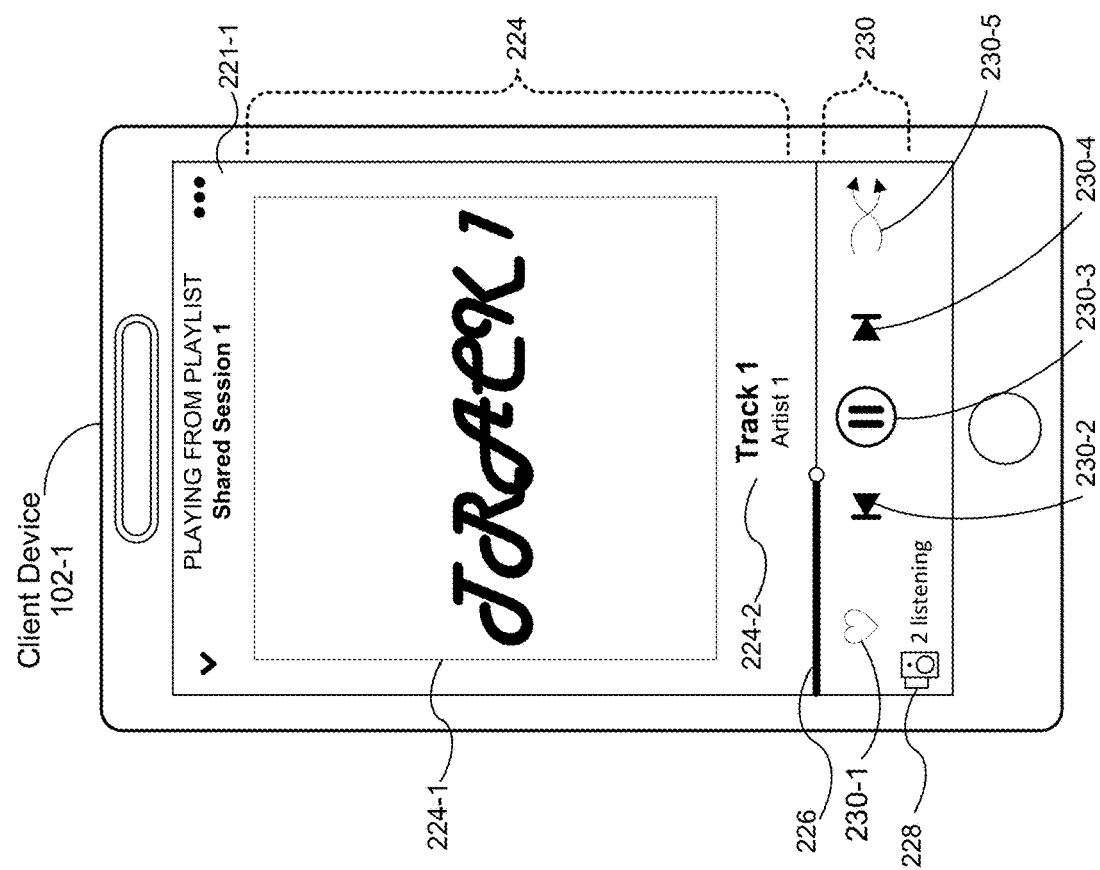

FIGS. 2E and 2F illustrate graphical user interfaces 221-1 and 221-1 presented on client device 102-1 and client device 102-2, respectively, during the shared playback session. Both client devices 102-1 and 102-2 include information regarding the currently presented media content in Playing From Playlist portion 224. In some embodiments, the information includes metadata of the media content that is being presented at the presentation device. For example, the information includes cover art image 224-1 as well as a title and/or artist information 224-2 (e.g., "Track 1," "Artist 1") of the media content item. The information also includes context data regarding the playback of the media content. For example, media scrubber control 226 (e.g., including a playhead that indicates a current playback point in a media item and that, when dragged across a timeline, changes the point in time from which the media item is played back) is presented on the client device. The graphical user interfaces 221-1 and 221-2 also include a connection indication 228, which indicates how many additional users and/or devices are connected to the shared playback session. In some embodiments, the client device 102-1 detects an input at a location that corresponds to connection indication 228. In response to detecting the input at the location that corresponds to connection indication 228, device 102-1 displays a sharing user interface (shown in FIG. 2B).

In some embodiments, one or more controls 230 displayed by client device 102-1 are the same as controls 230 displayed by client device 102-2. While the shared playback session is active, users that have joined the session are able to access the shared queue, and leave the queue. For example, any user is enabled to select to operate skip back 230-2 control to cease playback of the current media content and initiate playback of the prior track, pause (or play) 230-3 control to temporarily stop playback of the currently presented media content item (or resume playback), skip forward 230-4 control to begin playback of a next media content item in the shared playback queue, or shuffle 230-5 control to present the media content items of the shared playback queue out of order (e.g., the order presented as a list). In some embodiments, controls 230 are displayed to only a subset of users (e.g., as selected by the host) in the shared playback session. In some embodiments, the server 104 transmits controls 230 only to the host device (e.g., Sara's device 102-1), and the other users (e.g., client device 102-2) cannot use controls 230 to control playback. In some embodiments, the server transmits (e.g., for display) controls 230 to the devices of other users, but the controls are not selectable by the other users. In some embodiments, a first portion of controls 230 are transmitted, from the server 104, to the host and participants, and a second portion of controls 230 are only transmitted to the host. In some embodiments, at least one control displayed to a user, when operated, affects information stored in association with the user's profile (and does not affect the experience of other users in the shared playback session). For example, the favorite control 230-1 (which, when activated, adds the currently playing media content item to a favorites list and/or to the device's locally stored library) is displayed at device 102-1, while a distinct favorite control 230-6 is displayed at to device 102-2. This way, participants cannot add one or more media content item's to the host's favorites list. Instead, each device (e.g., participant) is enabled to activate the favorite control for the respective user of the device (e.g., each participant has a separate and distinct favorites list). In some embodiments, the favorite control is deactivated for participants (e.g., only the host is enabled to add to the host's favorite list during the shared playback session).

In some embodiments, only a host device of the shared playback session is enabled to control settings of the shared playback session. For example, the server transmits, to a host device, controls for removing and/or blocking participants from joining the shared playback session. In some embodiments, the server transmits, only to the host device, controls to change a presentation device and/or settings of the presentation device (e.g., volume).

Figure 2H:
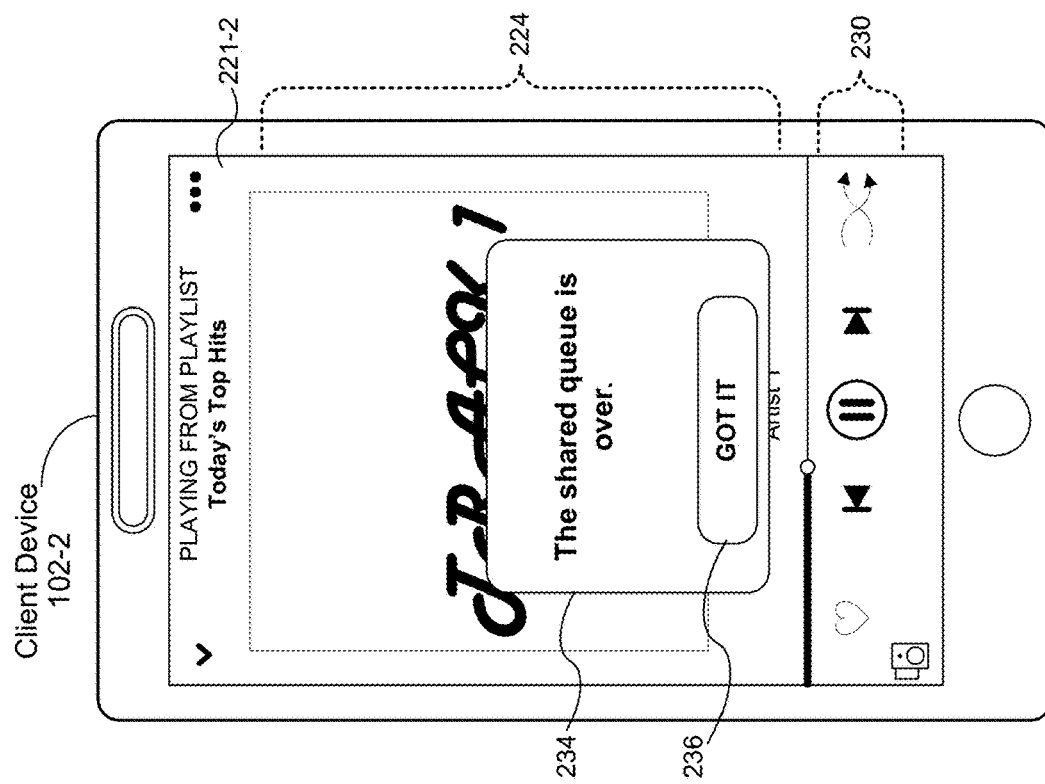
Figure 2G:
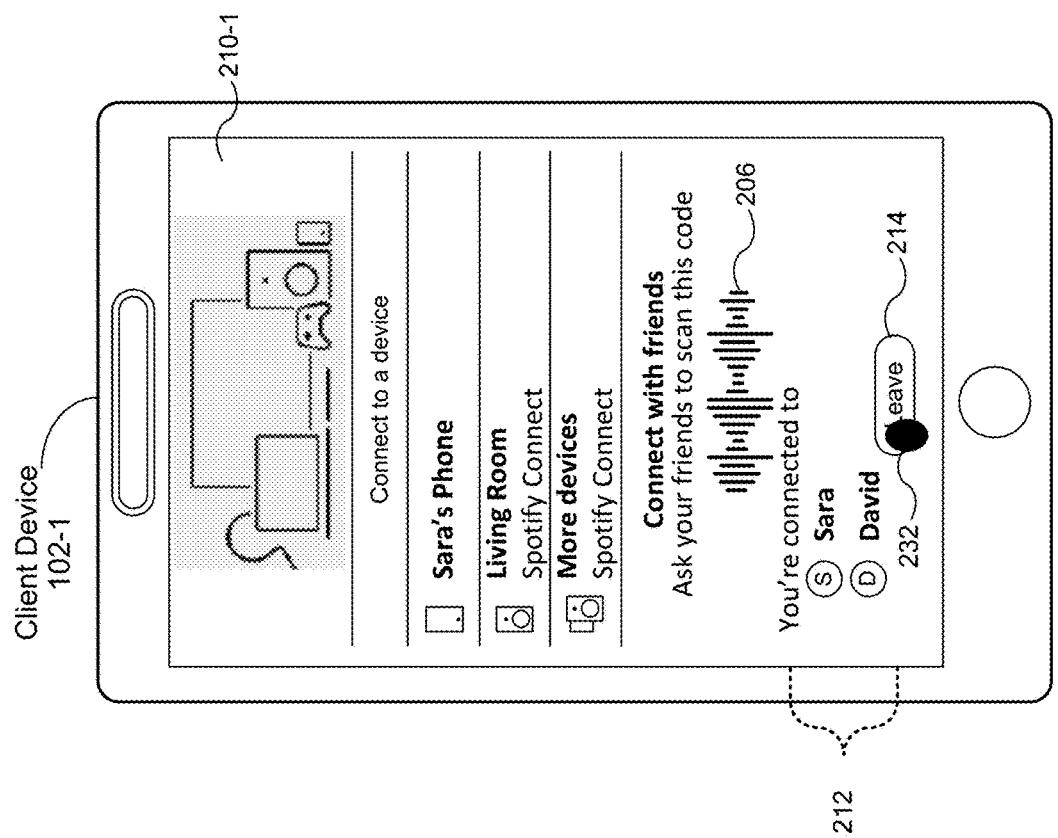

FIG. 2G illustrates a user input 232 detected by client device 102-1 (Sara's device) at a location corresponding to the "Leave" affordance 214. In some embodiments, because Sara is the host of the shared playback session, in response to receiving (e.g., at the server 104 and/or at client device 102-1) an indication of an input at the "Leave" affordance 214, the shared playback session ends.

In some embodiments, a client device 102-m joins the shared playback session hosted by client device 102-1 (e.g., Sara) after client device 102-2 (e.g., David) has joined the shared playback session. In some embodiments, when an indication of an input at the "Leave" affordance is received from a participant (e.g., not the host), on a respective participant client device, the shared playback session continues and the playback queue continues to be presented to the remaining users (e.g., the host and the remaining participants). For example, in response to receiving an indication of an input at the "Leave" affordance at client device 102-2 (e.g., David), client device 102-2 leaves the shared playback session (and is no longer connected to Sara and device 102-*m*). Because David was a participant (e.g., not the host) of the shared playback session, the shared playback queue continues to be presented to client device 102-1 (e.g., Sara) and client device 102-*m*. In some embodiments, after David has left the shared playback session, the device (e.g., server and/or device 102-*m*) receives an indication of an input at device 102-*m* to activate the "Leave" affordance. In some embodiments, in response to the input at device 102-*m* to "Leave," the shared playback session continues on host device 102-1 even though there are no additional participants. In some embodiments, in response to the input at participant device 102-*m* to "Leave," the shared playback session is terminated (e.g., by the server 104 and/or host device 102-1) because only host device 102-1 remained in the shared playback session.

In some embodiments, in response to the host leaving the shared playback session, the server system terminates the shared playback session and provides the users that remained in the shared playback session (e.g., user of device 102-2) with a notification 234 that the shared playback session is over, as illustrated in FIG. 2H. In some embodiments, the user of device 102-2 is enabled to dismiss the notification by selecting acknowledgement ("Got It") affordance 236. In some embodiments, after the shared playback session has been terminated (e.g., by the server system), the user of client device 102-2 chooses to continue to listen to the media content items that were included in the shared playback queue. For example, as shown in FIG. 2I, the user continues to listen to Track 1 from "Session 1". In some embodiments, because the playback queue of session 1 is maintained on client device 102-2, client device 102-2 is enabled to initiate a second shared playback session that includes the playback queue of the shared playback session that was terminated. In some embodiments, the playback queue of session 1 is maintained on the media content server 104 (e.g., in addition to or instead of being stored on the client device). This way, any remaining users who want to continue consuming the shared playback queue after the host terminated the session are able to join a new (second) shared playback session that continues from the point in the queue at which the previous session ended. After the shared playback session is terminated, connection indication 228 (FIG. 2F) no longer indicates that other devices are connected to device 102-2 through a shared playback session. Client device 102-2 displays connection options 240 to, for example, allow the user of device 102-2 to connect to or change a presentation device.

Figure 2J:
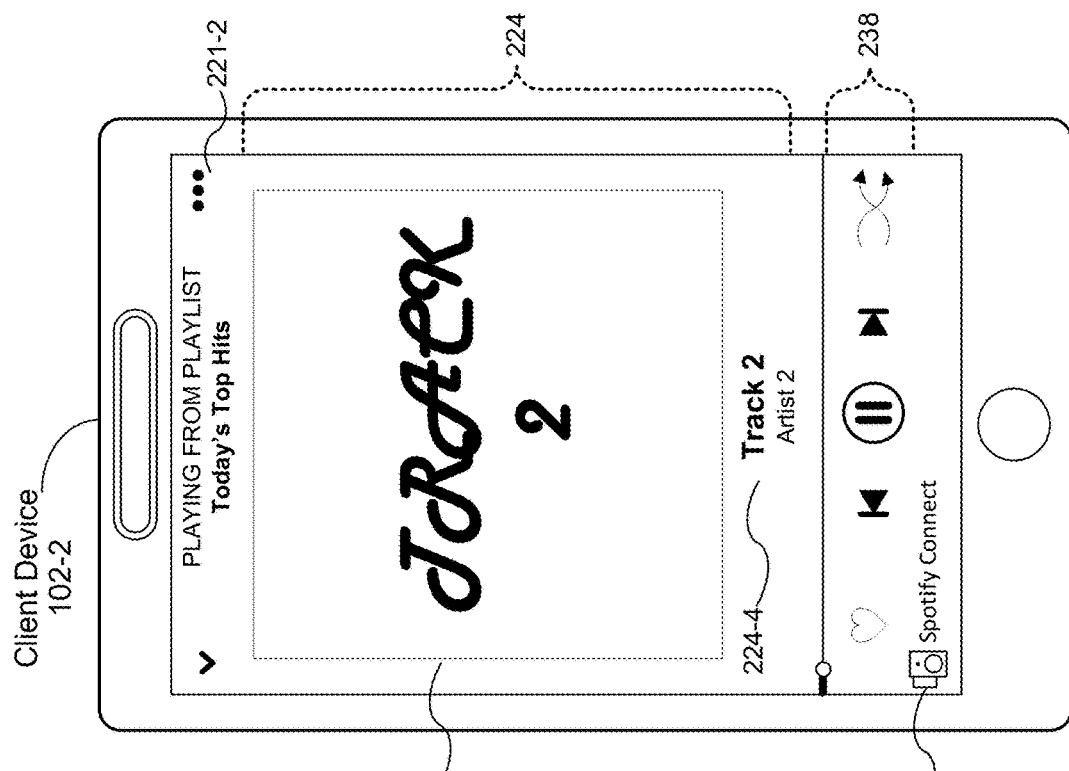
Figure 2I:
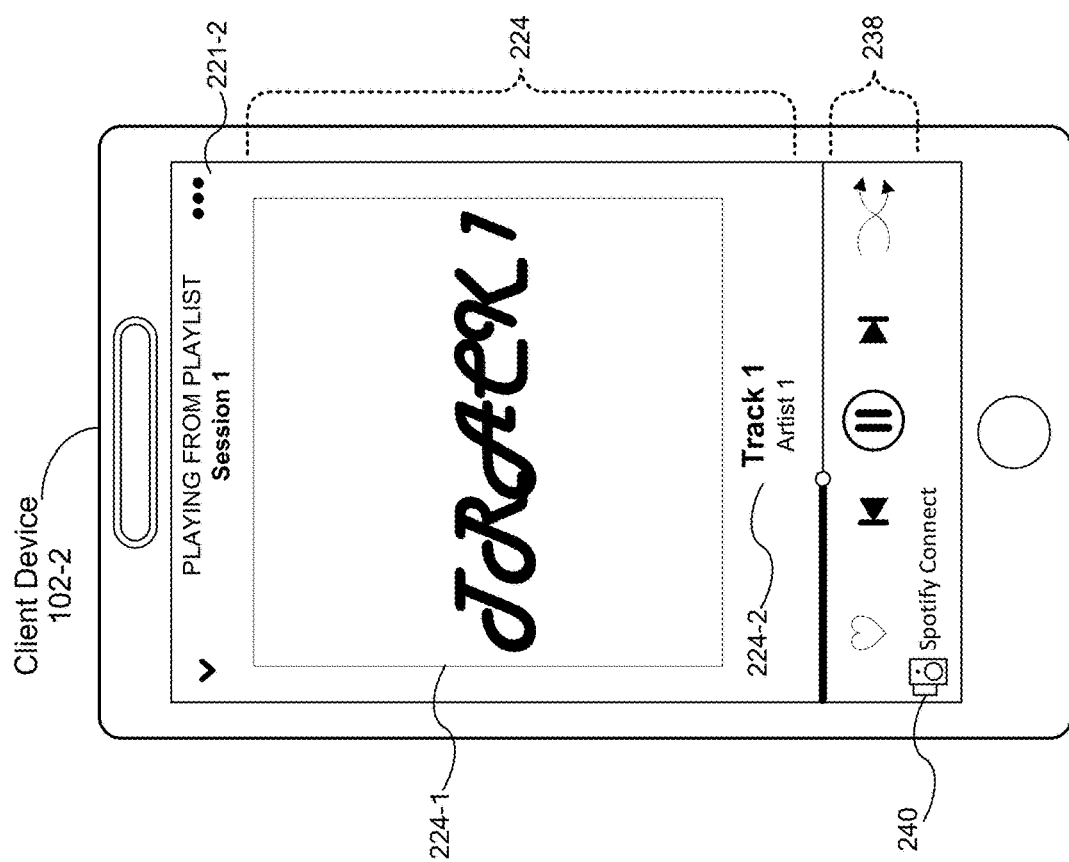

As shown in FIG. 2J, in some embodiments, in accordance with a termination that host device 102-1 has terminated the shared playback session, client device 102-2 ceases playback of the shared playback queue and initiates playback of the previously playing personal queue of the user of client device 102-2 (e.g., at a point in the personal queue that was playing when the user of device 102-2 joined the shared playback queue). For example, client device 102-2 is now playing "Track 2" indicated by information 224-3 and 224-4 from "Today's Top Hits" instead of continuing to play "Track 1" of the shared playback queue. In some embodiments, in response to the client device 102-2 selecting to return to the personal queue of the user, the previously shared playback queue (e.g., from Session 1) is released from storage (e.g., the shared playback queue for the shared playback session that had been terminated is cleared). In some embodiments, the client device resumes a previous personal queue that was streamed at the client device (e.g., David will resume listening to what was playing before joining Sara's shared playback session).

Figure 3B:
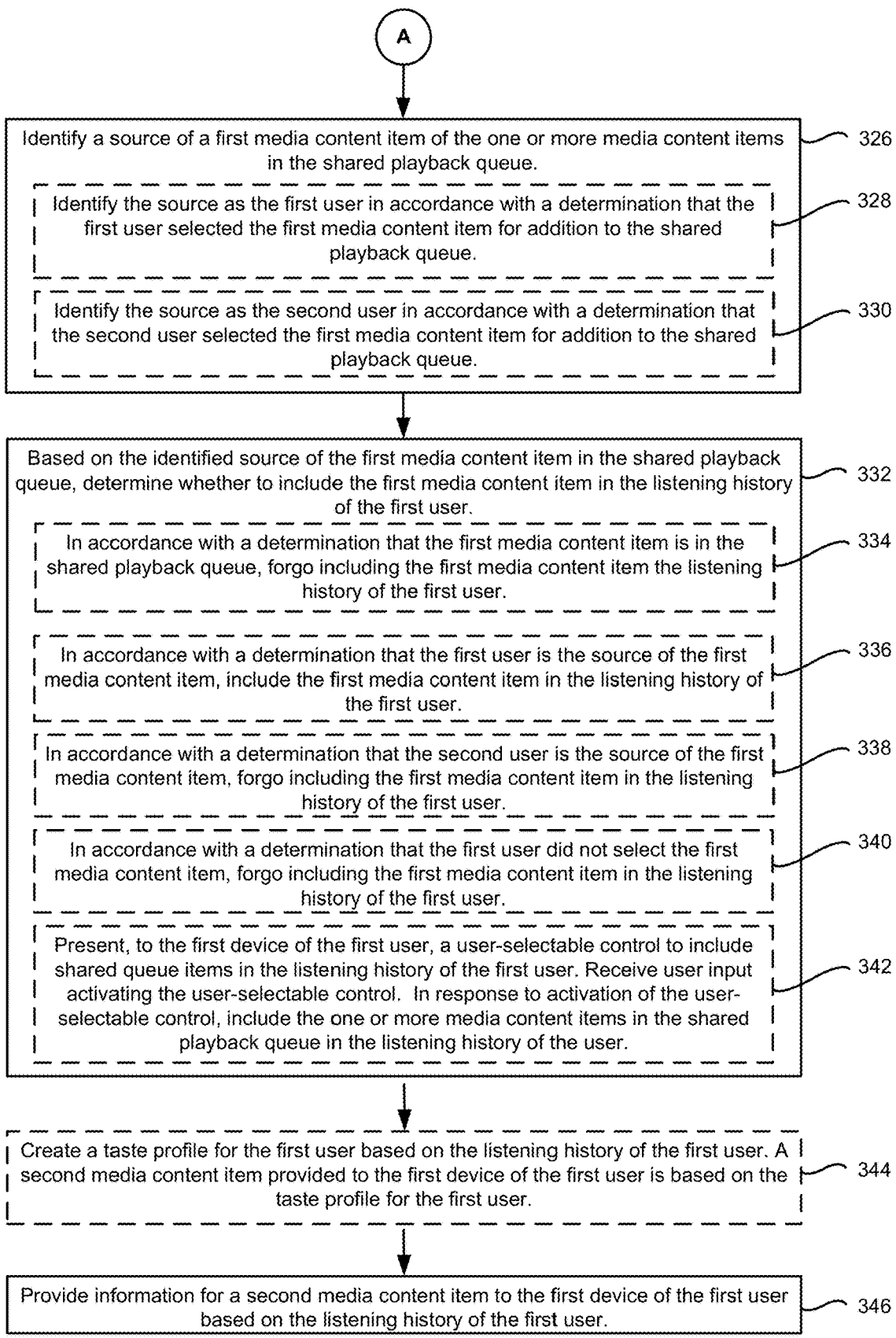

FIGS. 3A-3B are flow diagrams illustrating a method 300 for providing personalized content to a user, in accordance with some embodiments. Method 300 may be performed (302) at an electronic device (e.g., media content server 104, FIGS. 1 and 5; client device 102, FIGS. 1 and 4) having one or more processors and memory storing instructions for execution by the one or more processors. The electronic device is associated with a media-providing service (e.g., provides media content for playback to client devices 102 and/or media presentation systems 108 in a media content delivery system 100, and/or executes an application for the media-providing service). In some embodiments, the method 300 is performed by executing instructions stored in the memory of a server system (e.g., in memory 506, FIG. 5) or client device (e.g., in memory 412, FIG. 4). In some embodiments, the method 300 is performed by a combination of the server system and a client device.

Referring now to FIG. 3A, in performing the method 300, the electronic device stores (304), for a first user (e.g., David) of the media-providing service, a listening history corresponding to media content items provided by the media-providing service that have been previously consumed by the first user. In some embodiments, the listening history of the first user includes (306) content items selected by the first user for a playback queue (e.g., an individual playback queue that is distinct from the shared playback queue) of the first user.

In some embodiments, a media-providing service examines a user's listening history to attempt to identify user habits and personalize content based on these habits. For example, the listening history includes information about previous media content the user has consumed from the media-providing service, such as a title of a media content item, an artist, a genre of the media content item, etc. In some embodiments, the listening history of the user also includes contextual information about when the user consumed the media content items (e.g., a time of day, a day of the week, etc.). The media content server 104 collects the listening histories for multiple users (e.g., server system 104 stores listening history of the user in the listening history module 526, FIG. 5).

In some embodiments, the electronic device establishes (308) a shared playback queue in accordance with a determination that the first user has obtained information for the shared playback session from the second user (e.g., David from Sara, as explained with reference to FIGS. 2A-2B). In some embodiments, the electronic device sends (310) the information for the shared playback session to the second electronic device of the second user (e.g., the server system establishes the code 206 and sends the code to Sara's host device). The first device of the first user obtains the information for the shared playback session from the second device of the second user. In some embodiments, the electronic device provides (312) the second device of the second user with user-selectable options to select how to provide the information for the shared playback session from the second device to the first device (e.g., the server provides sharing options to the client device as described in FIG. 2C). In some embodiments, the first device of the first user provides (314) information for the shared playback session to a third device (e.g., a third device of a third user). In some embodiments, any user of the media-providing service that has obtained the information for the shared playback session is enabled to share (316) the information with additional users of the media-providing service (e.g., David, a participant (not the host) is enabled to share the information for the shared playback session (code 206) with additional users). In some embodiments, only one device (e.g., a host device) is enabled to provide the information to the additional users of the media-providing service. In some embodiments, only the host device is enabled to control settings of the shared playback session (e.g., selection of the playback device, volume, identification of a media content item as a favorite, etc.).

In some embodiments, the electronic device receives (318), from the first device, a request to join the shared playback queue (e.g., the server receives, from David's device 102-2, a request to join Sara's session). In some embodiments, the request to join the shared playback queue is generated by device 102-2 in accordance with a determination that device 102-2 has received (e.g., scanned via a camera of device 102-2, detected via an audio transducer of device 102-2, received a PIN via a user input, and/or received a user input selecting a received link) a code (e.g., scannable code 206). In response to the request, the electronic device determines a device type of the first device and selects a joining method based on the device type. For example, in accordance with a determination that the device type is a desktop computer, the electronic device selects an audio code as the joining method (e.g., because a desktop may not have a camera to detect a scannable code), and in accordance with a determination that the device type is a mobile phone, a scannable code is selected as the joining method. In some embodiments, the electronic device transmits, using the selected joining method, the code to the client device. It is to be understood that different device types may require different joining methods. In some embodiments, the user of the device joining and/or hosting the session is enabled to select which joining method to use.

The electronic device provides (320) a shared playback queue to a first device of the first user and a second device of a second user, the shared playback queue including one or more media content items corresponding to a shared playback session. In some embodiments, the electronic device initiates (e.g., establishes) the shared playback session before providing the shared playback queue to the first device. In some embodiments, the electronic device initiates the shared playback session in response to receiving a user input at the first device of the first user and/or a user input at the second device of the second user. For example, the electronic device initiates the shared playback session (and the shared playback queue) in response to receiving an indication that the second user has scanned the sharing scan code presented on the first device of the first user (e.g., as described with reference to FIGS. 2A-2B). In some embodiments, the one or more media content items corresponding to the shared playback session are selected (e.g., added) to the shared playback queue by an input from the first user, an input from the second user, and/or automatically by the service provider.

In some embodiments, the electronic device provides (322) information corresponding to the shared playback queue (e.g., provides the media content items in the shared playback queue) to a presentation device (e.g., the presentation device selected from the list shown in FIG. 2A). In some embodiments, the shared playback queue is presented to (e.g., played back to) the first user and the second user at the presentation device. In some embodiments, both the first user and the second user are within a predefined geographic proximity to the presentation device (e.g., within a same room or household). In some embodiments, the electronic device (e.g., server) sends to the first device and the information is forwarded to the presentation device.

In some embodiments, the listening history corresponds to a first listening history and the electronic device stores (324), for the first user, the one or more media content items of the shared playback queue in a second listening history of the first user that is distinct from the first listening history. For example, the first listening history corresponds to a user's personal queue and a second listening history corresponds to the shared playback session the user has joined. In some embodiments, each distinct shared playback session corresponds to a distinct listening history. In some embodiments, all of the shared playback sessions the user has joined are stored in the second listening history of the user (e.g., the shared playback sessions are combined into the second listening history).

Referring to FIG. 3B, the electronic device identifies (326) a source of a first media content item of the one or more media content items in the shared playback queue. For example, the source of the first media content item corresponds to a user (or the provider) that added (e.g., selected) the first media content item to be included in the shared playback queue. In some embodiments, the electronic device identifies (328) the source as the first user in accordance with a determination that the first user selected the first media content item for addition to the shared playback queue (e.g., if David selects the content item to add to the shared playback queue, the server identifies David as the source of the selected content item). In some embodiments, the electronic device identifies (330) the source as the second user (e.g., Sara) in accordance with a determination that the second user selected the first media content item for addition to the shared playback queue.

Based on the identified source of the first media content item in the shared playback queue, the electronic device determines (332) whether to include the first media content item in the listening history of the first user. The electronic device is enabled to distinguish, of the content consumed by the first user, which content is selected by the first user, which content is selected by another user, and which content is selected by the media-providing service (e.g., generated or curated as a recommendation/playlist).

In some embodiments, in accordance with a determination that the first media content item is in the shared playback queue, the electronic device forgoes (334) including the first media content item in the listening history of the first user. For example, the electronic device is enabled to distinguish between content consumed during a user's personal playback session versus content consumed during a shared playback session the user has joined. In some embodiments, only the user's personal queue (consumed during the user's personal session(s)) is included in the listening history of the user.

In some embodiments, in accordance with a determination that the first user is the source of the first media content item, the electronic device includes (336) the first media content item in the listening history of the first user. In some embodiments, in accordance with a determination that the second user is the source of the first media content item, the electronic device forgoes (338) including the first media content item in the listening history of the first user. In some embodiments, in accordance with a determination that the first user did not select the first media content item (e.g., the second user or the content provider selected the first media content item), the electronic device forgoes (340) including the first media content item in the listening history of the first user. For example, within the shared playback queue, only media content items that were selected by the first user are included (e.g., tracked) in the listening history of the first user.

In some embodiments, the electronic device presents (342), to the first device of the first user, a user-selectable control to include shared playback queue items in the listening history of the first user. In some embodiments, the electronic device receives user input activating the user-selectable control. In response to activation of the user-selectable control, the electronic device includes the one or more media content items in the shared playback queue in the listening history of the user. For example, the user selects whether to include a shared playback session in their listening history (and affect the personalized recommendations/ content for the user based on the shared playback sessions).

In some embodiments, the electronic device creates (344) a taste profile for the first user based on the listening history of the first user. For example, the taste profile is based on patterns identified based on the information stored in the listening history of the user. In some embodiments, the taste profile is assigned to the user (e.g., categorizes the user) as a profile representing genres, artists, or other characteristics of media content items that the user tends to consume. This allows the media-providing service to generate personalized recommendations for media content that match the taste profile of the user. The taste profile is generated and/or stored in taste profile module 528. In some embodiments, a second media content item is provided to the first device of the first user, and selection of the second media content item is based on the taste profile for the first user.

The electronic device provides (346) information for a second media content item to the first device of the first user based on the listening history of the first user. In some embodiments, the electronic device provides (e.g., streams) the second media content item to the first device for playback. In some embodiments, the information for the second media content item is provided to the first device after playback of the shared playback queue (e.g., after ending the shared playback session). In some embodiments, the information for the second media content item is provided to the first device during playback of the shared playback queue (e.g., while the shared playback session is ongoing). In some embodiments, the information for the second media content item is provided to the first device without user input (e.g., automatically) at the first device.

Although FIGS. 3A-3B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Figure 4:
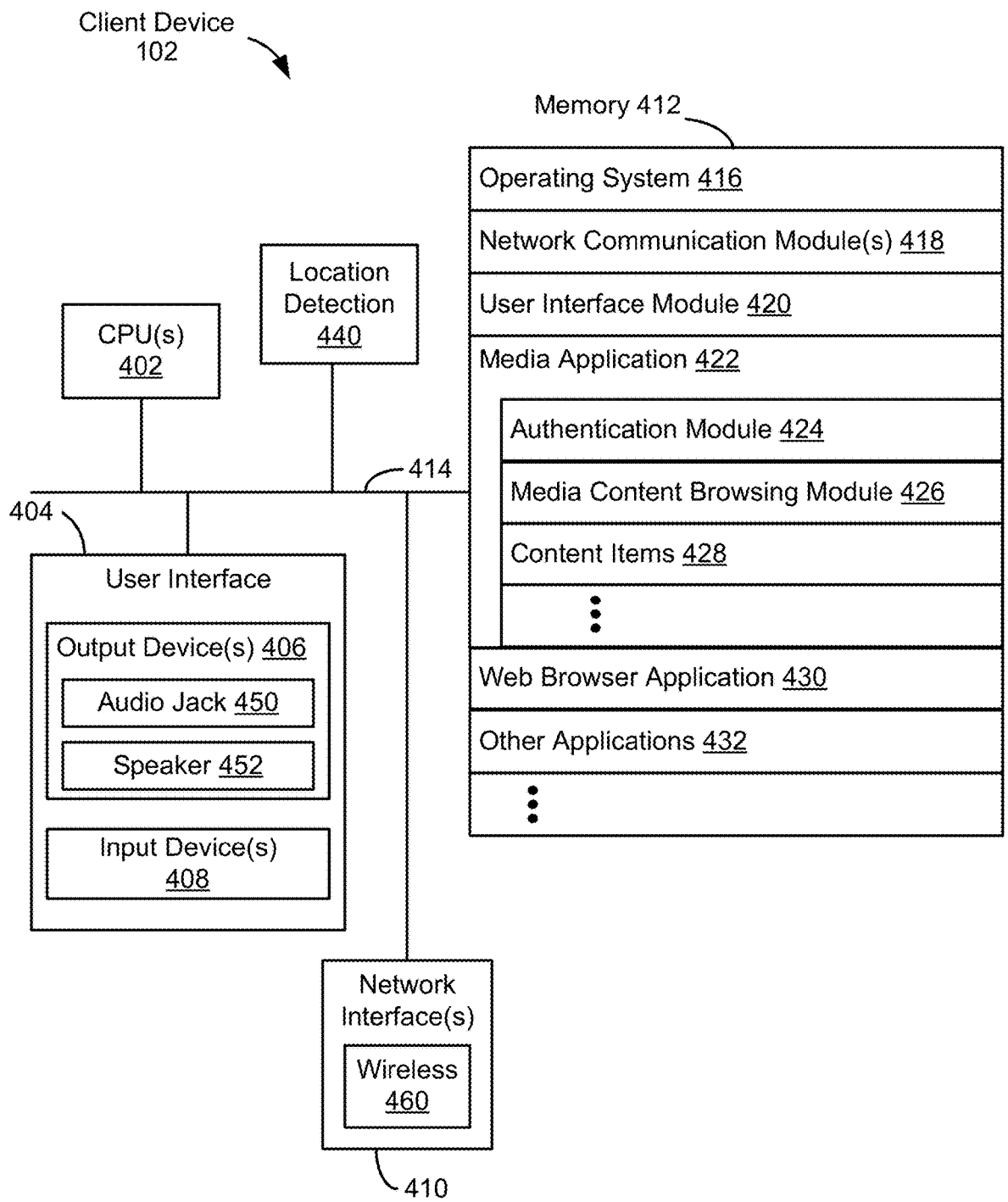
FIG. 4 is a block diagram illustrating a client device in accordance with some embodiments.

FIG. 4 is a block diagram illustrating a client device 102 (e.g., client device 102-1 and/or client device 102-m, FIG. 1) in accordance with some embodiments. The client device 102 includes one or more central processing units (CPU(s), i.e., processors or cores) 402, one or more network (or other communications) interfaces 410, memory 412, and one or more communication buses 414 for interconnecting these components. The communication buses 414 optionally include circuitry (sometimes called a chipset) that interconnects and controls communications between system components.

The client device 102 includes a user interface 404, including output device(s) 406 and input device(s) 408. In some embodiments, the input devices 408 include a keyboard, mouse, or track pad. Alternatively, or in addition, in some embodiments, the user interface 404 includes a display device that includes a touch-sensitive surface, in which case the display device is a touch-sensitive display. "User input," as described herein, may refer to a contact detected with a touch-sensitive display and/or an input by an input device 408. In some embodiments, the output devices (e.g., output device(s) 406) include a speaker 452 (e.g., speakerphone device) and/or an audio jack 450 (or other physical output connection port) for connecting to speakers, earphones, headphones, or other external listening devices. Furthermore, some client devices 102 use a microphone and voice recognition device to supplement or replace the keyboard. Optionally, the client device 102 includes an audio input device (e.g., a microphone) to capture audio (e.g., speech from a user).

Optionally, the client device 102 includes a location-detection device 440, such as a global navigation satellite system (GNSS) (e.g., GPS (global positioning system), GLONASS, Galileo, BeiDou) or other geo-location receiver, and/or location-detection software for determining the location of the client device 102 (e.g., module for finding a position of the client device 102 using trilateration of measured signal strengths for nearby devices).

In some embodiments, the one or more network interfaces 410 include wireless and/or wired interfaces for receiving data from and/or transmitting data to other client devices 102, media presentations systems 108, a media content server 104, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 410 include a wireless interface 460 for enabling wireless data communications with other client devices 102, media presentations systems 108, and/or or other wireless (e.g., Bluetooth-compatible) devices (e.g., for streaming audio data to the media presentations system 108 of an automobile). Furthermore, in some embodiments, the wireless interface 460 (or a different communications interface of the one or more network interfaces 410) enables data communications with other WLAN-compatible devices (e.g., a media presentations system 108) and/or the media content server 104 (via the one or more network(s) 112, FIG. 1).

In some embodiments, client device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 412 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 412 may optionally include one or more storage devices remotely located from the CPU(s) 402. Memory 412, or alternately, the non-volatile memory solid-state storage devices within memory 412, includes a non-transitory computer-readable storage medium. In some embodiments, memory 412 or the non-transitory computer-readable storage medium of memory 412 stores the following programs, modules, and data structures, or a subset or superset thereof:

- an operating system 416 that includes procedures for handling various basic system services and for performing hardware-dependent tasks;
- network communication module(s) 418 for connecting the client device 102 to other computing devices (e.g., media presentation systems 108, media content server 104, and/or other client devices) via the one or more network interface(s) 410 (wired or wireless) connected to one or more network(s) 112;
- a user interface module 420 that receives commands and/or inputs from a user via the user interface 404 (e.g., from the input devices 408) and provides outputs for playback and/or display on the user interface 404 (e.g., the output devices 406);
- a media application 422 (e.g., an application associated with and for accessing a content (i.e., media-providing) service provided by a media content provider such as media content server 104, including a media player, a streaming media application, or any other appropriate application or component of an application) for browsing, receiving, processing, presenting, and requesting playback of media (e.g., media items). The media application 422 is also used to monitor, store, and/or transmit (e.g., to media content server 104) data associated with user behavior. The media application 422 may include a content-personalization module (e.g., analogous to the content personalization module 524, FIG. 5) and also includes the following modules (or sets of instructions), or a subset or superset thereof:
  - an authentication module 424 for sending authentication tokens corresponding to one or more media presentation systems associated with the client device 102 (e.g., one or more of the media presentation systems 108 from FIG. 1), receiving authentication tokens from other devices, and/or generating authentication tokens for media presentation systems associated with client device 102;
  - a media content browsing module 426 for providing controls and/or user interfaces enabling a user to navigate, select for playback, and otherwise control or interact with media content, whether the media content is stored or played locally or remotely;
  - a content items module 428 for storing media items for playback, including storing a playback queue such as the shared playback queue 103;
- a web browser application 430 (e.g., Internet Explorer or Edge by Microsoft, Firefox by Mozilla, Safari by Apple, or Chrome by Google) for accessing, viewing, and interacting with web sites; and
- other applications 432, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

In some embodiments, the media presentation system 108 is a type of client device 102, and includes some or all of the same components, modules, and sub-modules as described above in FIG. 4 with respect to the client device 102.

Figure 5:
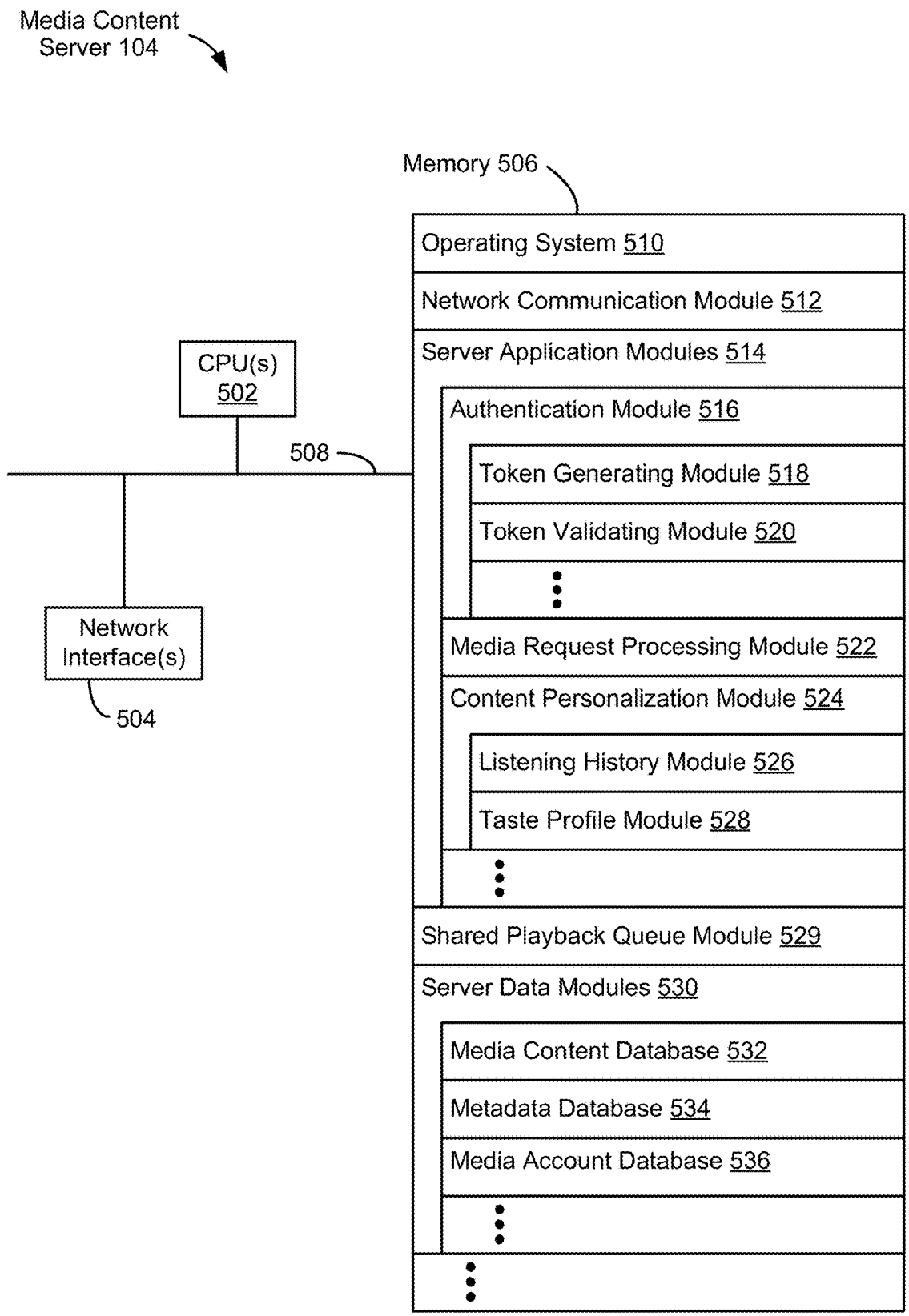
FIG. 5 is a block diagram illustrating a media content server in accordance with some embodiments.

FIG. 5 is a block diagram illustrating a media content server 104 in accordance with some embodiments. The media content server 104 typically includes one or more central processing units/cores (CPUs) 502, one or more network interfaces 504, memory 506, and one or more communication buses 508 for interconnecting these components.

Memory 506 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 506, optionally, includes one or more storage devices remotely located from one or more CPUs 502. Memory 506, or, alternatively, the non-volatile solid-state memory device(s) within memory 506, includes a non-transitory computer-readable storage medium. In some embodiments, memory 506, or the non-transitory computer-readable storage medium of memory 506, stores the following programs, modules and data structures, or a subset or superset thereof:

- an operating system 510 that includes procedures for handling various basic system services and for performing hardware-dependent tasks;
- a network communication module 512 that is used for connecting the media content server 104 to other computing devices via one or more network interfaces 504 (wired or wireless) connected to one or more networks 112;
- one or more server application modules 514 for performing various functions with respect to providing and managing a content service, the server application modules 514 including, but not limited to, one or more of:
  - an authentication module 516 for managing authentication and/or authorization requests, the authentication module 516 including, but not limited to, one or more of:
    - a token generating module 518 for generating authentication tokens permitting use of media presentation systems 108; and
    - a token validating module 520 for verifying that an authentication token is valid (e.g., has not yet expired or has not yet been revoked); and
  - a media request processing module 522 for processing requests for media content and facilitating access to requested media items by client devices (e.g., the client device 102) including, optionally, streaming media content to such devices and/or to one or more media presentation systems 108;
  - a content personalization module 524 for providing personalized content (e.g., playlists, tracks, advertisements, tooltips, notifications, etc.) to users of the content service, including, but not limited to, one or more of:
    - a listening history module 526 for processing (e.g., compiling) and storing data (e.g., in a listening history) relating to media content items that a user has consumed from the media-providing service (e.g., each user of the media-providing service has at least one listening history); and a taste profile module 528 for processing (e.g., identifying and/or compiling) taste profiles (e.g., indicating user preferences for media content) for users of the media-providing service based on characteristics of the media content items included in the listening history of the respective user;

a shared playback queue module 529 for storing media content items selected by users of shared playback sessions and/or selecting content to include in shared playback queues;

one or more server data module(s) 530 for handling the storage of and access to media items and metadata relating to the media items; in some embodiments, the one or more server data module(s) 530 include:

a media content database 532 for storing media items (e.g., audio files, video files, text files, etc.);

a metadata database 534 for storing metadata relating to the media items; and a media account database 536 for storing account information for user media accounts, including user profiles, credentials (e.g., user identifiers, passwords, email addresses, etc.), credentials or identifiers of any linked accounts, and the like.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 412 and 506 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 412 and 506 optionally store a subset or superset of the respective modules and data structures identified above. Furthermore, memory 412 and 506 optionally store additional modules and data structures not described above. In some embodiments, modules stored in memory 412 may also be stored in memory 506 (and vice-versa). For example, the shared playback queue module 529 may be stored at the media content server 104 in memory 506 and/or stored in memory 412 at the client device 102.

Although FIG. 5 illustrates the media content server 104 in accordance with some embodiments, FIG. 5 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement the media content server 104, and how features are allocated among them, will vary from one embodiment to another and, optionally, depends in part on the amount of data traffic that the server system handles during peak usage periods as well as during average usage periods.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method, comprising:

at an electronic device associated with a media-providing service and having one or more processors and memory storing instructions for execution by the one or more processors:

receiving a request, from a first device of a host user, to initiate a first shared playback session for the first device;

streaming media content from a first playback queue to the first device and to one or more additional devices, the first playback queue including one or more media content items corresponding to the first shared playback session;

determining that the first device of the host user has left the first shared playback session;

in response to the first device of the host user leaving the first shared playback session, maintaining the first playback queue to be accessed by the one or more additional devices;

after the host user has left the first shared playback session, providing one or more media content items from the first playback queue to at least one of the one or more additional devices;

receiving a request, from a second device of the one or more additional devices, to reestablish the first shared playback session for the one or more additional devices;

in response to receiving the request from the second device, initiating a second shared playback session for the one or more additional devices, wherein:

the second shared playback session does not include the first device of the host user; and the second shared playback session has a second playback queue that includes one or more media content items from the first shared playback session; and providing the one or more media content items from the second playback queue to the one or more additional devices that are in the second shared playback session.

2. The method of claim 1, wherein:

determining that the first device of the host user has left the first shared playback session is performed while streaming a first media item from the first playback queue, and the method further comprises, after initiating the second shared playback session having the second playback queue, streaming, from the second playback queue, a second media item that was positioned after the first media item in the first playback queue.

3. The method of claim 1, further comprising:

after determining that the first device of the host user has left the first shared playback session, receiving a request, from a third device of the one or more additional devices, to playback a third media content item that is not in the first playback queue; and in response to receiving the request from the third device:
provviding the third media content item to the third device; and
ceasing to provide the first playback queue to the third device.

4. The method of claim 3, wherein:
maintaining the first playback queue comprises storing the first playback queue in memory to be accessed by the one or more additional devices, and
the method further comprises, in response to receiving the request from the third device to playback the third media content item that is not in the first playback queue, releasing the first playback queue from the memory.

5. The method of claim 1, further comprising:
in response to the host user leaving the first shared playback session:
ending the first shared playback session; and
providing a notification indicating the first shared playback session has ended to each of the one or more additional devices that are in the first shared playback session.

6. The method of claim 1, wherein the one or more media content items from the first playback queue are provided to the at least one of the one or more additional devices without maintaining the first shared playback session.

7. The method of claim 1, further comprising:
after determining that the first device of the host user has left the first shared playback session, receiving a request, from a fourth device of the one or more additional devices, to playback a fourth media content item that is in the first playback queue; and
in response to receiving the request from the fourth device:
providing the fourth media content item to the fourth device without initiating a shared playback session with additional users.

8. An electronic device associated with a media-providing service, comprising:
one or more processors; and
memory storing one or more programs for execution by the one or more processors, the one or more programs including instructions for:
receiving a request, from a first device of a host user, to initiate a first shared playback session for the first device;
streaming media content from a first playback queue to the first device and to one or more additional devices, the first playback queue including one or more media content items corresponding to the first shared playback session;
determining that the first device of the host user has left the first shared playback session;
in response to the first device of the host user leaving the first shared playback session, maintaining the first playback queue to be accessed by the one or more additional devices;
after the host user has left the first shared playback session, providing one or more media content items from the first playback queue to at least one of the one or more additional devices;

receiving a request, from a second device of the one or more additional devices, to reestablish the first shared playback session for the one or more additional devices;
in response to receiving the request from the second device, initiating a second shared playback session for the one or more additional devices, wherein:
the second shared playback session does not include the first device of the host user; and
the second shared playback session has a second playback queue that includes one or more media content items from the first shared playback session; and
providing the one or more media content items from the second playback queue to the one or more additional devices that are in the second shared playback session.

9. The electronic device of claim 8, wherein:
determining that the first device of the host user has left the first shared playback session is performed while streaming a first media item from the first playback queue, and
the one or more programs further include instructions for, after initiating the second shared playback session having the second playback queue, streaming, from the second playback queue, a second media item that was positioned after the first media item in the first playback queue.

10. The electronic device of claim 8, the one or more programs further including instructions for:
after determining that the first device of the host user has left the first shared playback session, receiving a request, from a third device of the one or more additional devices, to playback a third media content item that is not in the first playback queue; and
in response to receiving the request from the third device:
providing the third media content item to the third device; and
ceasing to provide the first playback queue to the third device.

11. The electronic device of claim 10, wherein:
maintaining the first playback queue comprises storing the first playback queue in memory to be accessed by the one or more additional devices; and
the one or more programs further include instructions for, in response to receiving the request from the third device to playback the third media content item that is not in the first playback queue, releasing the first playback queue from the memory.

12. The electronic device of claim 11, the one or more programs further including instructions for:
in response to the host user leaving the first shared playback session:
ending the first shared playback session; and
providing a notification indicating the first shared playback session has ended to each of the one or more additional devices that are in the first shared playback session.

13. The electronic device of claim 8, wherein the one or more media content items from the first playback queue are provided to the at least one of the one or more additional devices without maintaining the first shared playback session.

14. The electronic device of claim 8, the one or more programs further including instructions for:
after determining that the first device of the host user has left the first shared playback session, receiving a request, from a fourth device of the one or more additional devices, to playback a fourth media content item that is in the first playback queue; and in response to receiving the request from the fourth device:

providing the fourth media content item to the fourth device without initiating a shared playback session with additional users.

15. A non-transitory computer-readable storage medium, storing one or more programs for execution by one or more processors of an electronic device associated with a media-providing service, the one or more programs including instructions for:

receiving a request, from a first device of a host user, to initiate a first shared playback session for the first device;

streaming media content from a first playback queue to the first device and to one or more additional devices, the first playback queue including one or more media content items corresponding to the first shared playback session;

determining that the first device of the host user has left the first shared playback session;

in response to the first device of the host user leaving the first shared playback session, maintaining the first playback queue to be accessed by the one or more additional devices;

after the host user has left the first shared playback session, providing one or more media content items from the first playback queue to at least one of the one or more additional devices;

receiving a request, from a second device of the one or more additional devices, to reestablish the first shared playback session for the one or more additional devices;

in response to receiving the request from the second device, initiating a second shared playback session for the one or more additional devices, wherein:

the second shared playback session does not include the first device of the host user; and the second shared playback session has a second playback queue that includes one or more media content items from the first shared playback session; and providing the one or more media content items from the second playback queue to the one or more additional devices that are in the second shared playback session.

* * * * *